(12) United States Patent
Kishiyama et al.

(10) Patent No.: US 10,924,231 B2
(45) Date of Patent: Feb. 16, 2021

(54) RADIO BASE STATION APPARATUS, MOBILE STATION APPARATUS AND RADIO COMMUNICATION METHOD

(71) Applicant: NTT DOCOMO, INC., Tokyo (JP)

(72) Inventors: Yoshihisa Kishiyama, Kanagawa (JP); Hidekazu Taoka, Kanagawa (JP); Mamoru Sawahashi, Kanagawa (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/516,279

(22) Filed: Oct. 16, 2014

(65) Prior Publication Data

US 2015/0085819 A1    Mar. 26, 2015

Related U.S. Application Data

(63) Continuation of application No. 13/256,232, filed as application No. PCT/JP2010/054397 on Mar. 16, 2010, now Pat. No. 9,281,926.

(30) Foreign Application Priority Data

Mar. 16, 2009 (JP) .............................. JP2009-063594

(51) Int. Cl.
*H04L 5/00* (2006.01)
*H04L 1/00* (2006.01)
*H04L 25/02* (2006.01)

(52) U.S. Cl.
CPC .......... *H04L 5/0048* (2013.01); *H04L 1/0026* (2013.01); *H04L 1/0031* (2013.01);
(Continued)

(58) Field of Classification Search
CPC ... H04L 1/0026; H04L 1/0031; H04L 5/0023; H04L 5/0053
See application file for complete search history.

(56) References Cited

U.S. PATENT DOCUMENTS 8,391,232 B2 * 3/2013 Ko ........................... H04J 13/18
370/330
2009/0304104 A1 12/2009 Le Saux et al.
(Continued)

FOREIGN PATENT DOCUMENTS

| WO | 2008062131 A1 | 5/2008 |
|---|---|---|
| WO | 2008/149533 A1 | 12/2008 |
| WO | 2010/064842 A2 | 6/2010 |

OTHER PUBLICATIONS

U.S. Appl. No. 61/098,130, filed 2008.*
(Continued)

*Primary Examiner* — Kodzovi Acolatse
*Assistant Examiner* — Farhad Ali
(74) *Attorney, Agent, or Firm* — Osha Bergman Watanabe & Burton LLP

(57) ABSTRACT

To provide a radio base station apparatus and radio communication method capable of performing radio communications using downlink reference signal structures suitable for antenna virtualization, a radio base station apparatus (200) has a plurality of transmission antennas, generates CRSs used in demodulation of at least downlink control information, CQI-RSs generated for each of the transmission antennas used in measurement of channel quality, and DM-RSs generated for each stream used in demodulation of downlink transmission data, and multiplexes the CRSs, CQI-RSs and DM-RSs into a same transmission time unit to transmit from each of the antennas.

4 Claims, 17 Drawing Sheets

(52) U.S. Cl.
CPC .......... *H04L 5/0023* (2013.01); *H04L 5/0053* (2013.01); *H04L 25/0204* (2013.01); *H04L 25/0228* (2013.01)

(56) References Cited

U.S. PATENT DOCUMENTS

| | | | | | |
|---|---|---|---|---|---|
| 2010/0118989 | A1* | 5/2010 | Sayana | ................. | H04L 5/0035 375/260 |
| 2010/0238877 | A1* | 9/2010 | Nam | ..................... | H04L 5/0048 370/329 |
| 2012/0250608 | A1* | 10/2012 | Wang | .................. | H04B 7/0421 370/328 |

OTHER PUBLICATIONS

International Search Report w/translation from PCT/JP2010/054397 dated Apr. 13, 2010 (4 pages).
3GPP TSG-RAN WG1 #56, R1-090874; "Views for DL MIMO operation in LTE-A"; Qualcomm Europe; Athens, Greece; Feb. 9-13, 2009 (7 pages).
3GPP TSG RAN WG1#56, R1-090826; "Cinnib RS for DL high-order MIMO"; Huawei; Athens, Greece; Feb. 9-13, 2009 (2 pages).
3GPP TSG-RAN WG1 #56, R1-090875; "Further Considerations and Link Simulations on Reference Signals in LTE-A"; Qualcomm Europe; Athens, Greece; Feb. 9-13, 2009 (6 pages).
3GPP TSG RAN WG1 #56, R-1090619; "DL RS Designs for Higher Order MIMO"; Samsung; Athens, Greece; Feb. 9-13, 2009 (7 pages).
3GPP TSG RAN WG1 Meeting #56bis, R1-091483; "DL RS Design for LTE-Advanced"; NTT DOCOMO; Seoul, Korea; Mar. 23-27, 2009 (6 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).
Notification of Reasons for Rejection for Japanese Application No. 2012-172202 dated Jan. 22, 2013, with English translation thereof (3 pages).
Decision to Grant a Patent in corresponding Japanese application No. 2012-172202 dated Apr. 30, 2013 (4 pages).
Office Action in corresponding Japanese Patent Application No. 2013-137845 dated May 27, 2014, with translation (9 pages).
Decision to Grant a Patent in related Japanese application No. 2013-137845, dated Aug. 19, 2014 (4 pages).
3GPP TSG RAN WG1#56, R1-090826; "Common RS for DL high-order MIMO"; Huawei; Athens, Greece; Feb. 9-13, 2009 (2 pages).
Non-Final Office Action issued in related U.S. Appl. No. 13/256,232, dated May 7, 2015 (16 pages).

Extended Search Report issued in related European Application No. 10753505.6, dated Aug. 6, 2014 (12 pages).
Extended Search Report issued in related European Application No. 15174770.6, dated Mar. 29, 2016 (15 pages).
Extended Search Report issued in related European Application No. 14193220.2, dated Jul. 17, 2015 (13 pages).
Office Action issued in related European Application No. 14193220.2, dated Jan. 25, 2016 (4 pages).
Catt; "Dual ports DRS design for BF"; 3GPP TSG RAN WG1 Meeting #55bis, R1-090185; Ljubljana, Slovenia; Jan. 12-16, 2009 (7 pages).
Nokia Siemens Networks et al.; "DM RS sequence hopping and coordination"; 3GPP TSG RAN WG1 #49, R1-072295; Kobe, Japan; May 7-11, 2007 (3 pages).
Samsung; "Issues on DL RS Design for Higher Order MIMO"; 3GPP TSG RAN WG1 #55, R1-084169; Prague, Czech Republic; Nov. 10-14, 2008 (3 pages).
Qualcomm Europe; "SU-MIMO operation for UL of LTE-A"; 3GPP TSG-RAN WG1 #56, R1-090872; Athens, Greece; Feb. 9-13, 2009 (3 pages).
LG Electronics; "Issues on DL-RS Design for LTE-A"; 3GPP TSG RAN WG1 Meeting #56, R1-090787; Athens, Greece; Feb. 9-13, 2009 (5 pages).
Texas Instruments; "Joint Processing Downlink COMP Reference Signal Support"; 3GPP TSG RAN WG1 56, R1-090586; Athens, Greece; Feb. 12-16, 2009 (7 pages).
Catt et al.; "Way forward on downlink reference signals for LTE-A"; 3GPP TSG-RAN WG1 #56, R1-091066; Athens, Greece; Feb. 9-13, 2009 (2 pages).
Office Action issued in corresponding Korean Application No. 10-2014-7015722, dated Jun. 15, 2016 (7 pages).
NTT DoCoMo et al.; "Three-Step Cell Search Method for E-UTRA"; 3GPP TSG RAN WG1 Meeting #46bis, R1-062722 (Original R1-062095); Seoul, Korea; Oct. 9-13, 2006 (4 pages).
Office Action dated Nov. 25, 2016, in corresponding European Patent Application No. 14193220.2 (6 pages).
Office Action issued in the counterpart European Patent Application No. 15174770.6, dated Oct. 28, 2016 (6 pages).
ZTE; "Uplink Reference signal and Uplink Timing Control"; 3GPP TSG RAN WG1 Ad Hoc on LTE, Tdoc R1-060122; Helsinki, Finland; Jan. 23-25, 2006 (4 pages).
Office Action issued in the counterpart Indian Patent Application No. 3770/KOLNP/2011, dated Feb. 22, 2019 (7 pages).
Office Action issued in Brazilian Application No. BR122015003526-0; dated Jan. 16, 2020 (6 pages).
Office Action issued in Brazilian Application No. PI1009489-0; dated Jan. 9, 2020 (5 pages).
Office Action issued in Indian Application No. 2668/KOLNP/2014; dated Oct. 31, 2019 (6 pages).

* cited by examiner (a)

(b)

(a)

(b)

(a)

(b)

RADIO BASE STATION APPARATUS, MOBILE STATION APPARATUS AND RADIO COMMUNICATION METHOD

CROSS-REFERENCE TO RELATED APPLICATIONS

The present application is a continuation application of and, thereby, claims benefit under 35 U.S.C. § 120 to U.S. patent application Ser. No. 13/256,232 filed on Sep. 13, 2011, titled, "RADIO BASE STATION APPARATUS, MOBILE STATION APPARATUS AND RADIO COMMUNICATION METHOD," which is a national stage application of PCT Application No. PCT/JP2010/054397, filed on Mar. 16, 2010, which claims priority to Japanese Patent Application No. 2009-063594 filed on Mar. 16, 2009. The contents of the priority applications are incorporated by reference in their entirety.

TECHNICAL FIELD

The present invention relates to a radio base station apparatus, mobile station apparatus and radio communication method for transmitting downlink reference signals.

BACKGROUND ART

The communication system that is a successor to the Wideband Code Division Multiple Access (WCDMA) system, High-Speed Downlink Packet Access (HSDPA) system, High-Speed Uplink Packet Access (HSUPA) system and the like i.e. Long Term Evolution (LTE) has been established by 3GPP that is the standardization group of WCDMA (Release-8). As a radio access scheme in Release-8 LTE (hereinafter, referred to as REL8-LTE), the Orthogonal Frequency Division Multiplexing Access (OFDMA) system is specified in downlink, while the Single-Carrier Frequency Division Multiple Access (SC-FDMA)) system is specified in uplink.

The OFDMA system is a multicarrier transmission system for dividing a frequency band into a plurality of narrow frequency bands (subcarriers), and assigning data onto each subcarrier to perform transmission. The subcarriers are orthogonal to one another and arranged densely on the frequency axis, high-speed transmission is thereby achieved, and it is expected enhancing spectral efficiency.

The SC-FDMA system is a single-carrier transmission system for dividing the frequency band for each terminal, and performing transmission using frequency bands different from one another among a plurality of terminals. It is possible to reduce interference between terminals with ease and effectively, it is further possible to reduce variations in transmission power, and therefore, this system is preferable from the viewpoints of low power consumption in the terminal, wide coverage, etc.

Further, REL8-LTE specifies downlink reference signal structures. The downlink reference signals are used in 1) downlink CQI (Channel Quality Indicator) measurement for scheduling and adaptive control, 2) channel estimation for downlink coherent detection in user terminals (hereinafter, referred to as LTE terminals) supporting REL8-LTE, and 3) estimation of downlink propagation path state for cell search and handover. Defined as the downlink reference signals are a cell-specific reference signal, reference signal common in a plurality of cells, and specific reference signal for beam forming.

Furthermore, REL8-LTE specifies radio transmission methods (MIMO: Multiple-Input Multiple-Output) for improving the communication quality by providing each of a transmitter and receiver with a plurality of antennas (for example, Non-patent Document 1). The methods are divided into the case (single-user MIMO) where all concurrently transmitted layers (data streams) are for the same user, and the case (multi-user MIMO) where the layers are for different users.

Single-user MIMO permit s spatial multiplexing of four layers using maximum four transmission antennas in a base station. Each layer is not in a one-to-one correspondence with the transmission antennas, and is transmitted from all the transmission antennas using mutually different transmission phase/amplitude control (precoding). By precoding, the layers that are concurrently transmitted are virtually received orthogonally to one another (without mutually interfering) on the receiver side. Therefore, precoding vectors (weights of the transmission antennas) are determined by considering fading variations so that the layers (data streams) that are concurrently transmitted do not interfere mutually and are received in high SINR in LTE terminals. Further, by precoding, it is possible to perform beam formation that actualizes directional transmission for emphasizing desired signals to a particular user terminal.

Multi-user MIMO is actualized by assigning the same resource block (RB) in some subframe to layers of a plurality of user terminals. In the case of multi-user MIMO, the number of layers assigned to each user is limited to "1".

CITATION LIST

Non-patent Literature

[Non-patent Literature 1] 3GPP, TR25.913[1]
[Non-patent Literature 2] T. Ihara et al., IEEE ICCS 2002

SUMMARY OF INVENTION

Technical Problem

In addition, antenna virtualization techniques have been proposed in which reference signals are subjected to precoding and transmitted from each transmission antenna of a transmitter, and are thereby transmitted by the number of virtual antennas smaller than the number of actual antennas (for example, Non-patent Document 2), but downlink reference signal structures have not been studied in the case of antenna virtualization in the MIMO system.

The present invention was made in view of such a respect, and it is an object of the invention to provide a radio base station apparatus and radio communication method capable of performing radio communications using downlink reference signal structures suitable for antenna virtualization.

Solution to Problem

In a first aspect of the invention, a radio base station apparatus is configured which is provided with a plurality of transmission antennas, a downlink reference signal generating section that generates first reference signals used in demodulation of at least downlink control information, second reference signals generated for each of the transmission antennas used in measurement of channel quality, and third reference signals generated for each stream used in demodulation of downlink transmission data, and a transmission section that multiplexes the first to third reference signals into a same transmission time unit to transmit from each of the antennas.

According to the first aspect of the invention, it is possible to perform radio communications using downlink reference signal structures suitable for antenna virtualization.

Technical Advantage of Invention

According to the invention, it is possible to provide downlink reference signal structures suitable for antenna virtualization.

DESCRIPTION OF EMBODIMENTS

An Embodiment of the invention will specifically be described below with reference to accompanying drawings.

In a first aspect, three types of reference signals are included as downlink reference signals to apply antenna virtualization.

As the first reference signal, used is a reference signal (referred to as "CRS" (Common Reference Signal) in the Description) common in a plurality of cells. As the CRS, it is possible to reuse a common reference signal common in cells that is defined in REL8-LTE. The CRS is used in demodulation of at least the shared data channel (PDSCH) in supporting an LTE terminal in the same band. Further, the CRS is used in demodulation of common control channels including the paging channel (PCH), broadcast channel (BCH), etc. in a terminal (hereinafter, referred to as an LTE-A terminal) of LTE-Advanced (hereinafter, referred to as LTE-A) that is a successor radio access scheme to REL8-LTE.

As the second reference signal, prepared is a reference signal (referred to as "CQI-RS" (Channel Quality Indicator-Reference Signal) in the Description) used in CSI (Channel State Information) measurement for each antenna in a MIMO system. Since the above-mentioned CRS is a reference signal common in cells, in the case of performing antenna virtualization, reference signals for each antenna do not exist, and it is not possible to perform CSI (Channel State Information) measurement for each antenna. Therefore, the CQI-RS is prepared for each actual antenna.

As the third reference signal, prepared is a reference signal (referred to as "DS-RS" (Demodulation-Reference Signal) in the Description) that is a user-specific reference signal and used in demodulation of the common data channel (PDSCH) in the LTE-A terminal. Orthogonal reference signals among streams are used.

Three types of downlink reference signals, CRS, CQI-RS, DM-RS, to which antenna virtualization is applied will specifically be described below.

Considered first is the case of assigning (multiplexing) CRSs for four antennas specified in REL8-LTE to radio resources in a four-antenna MIMO system.

Figure 3:
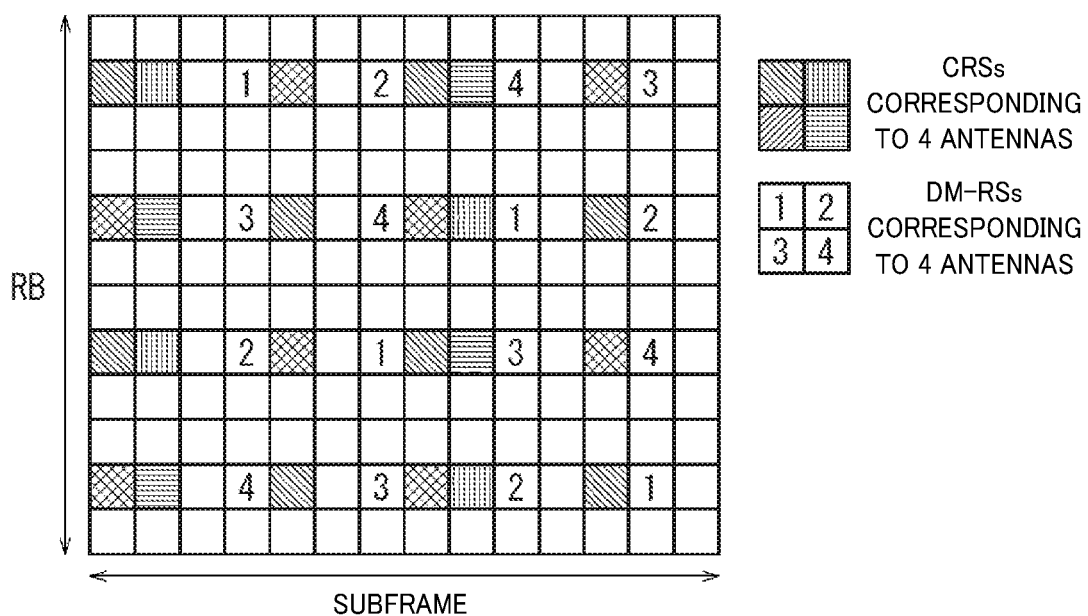
FIG. 3 is a diagram illustrating a state in which CRSS prepared for all of four antenna ports are assigned to radio resources.

FIG. 3 shows the state in which four CRSs prepared for each of four antennas are multiplexed in radio resources. FIG. 3 shows radio resources with the size of one resource block in the frequency-axis direction and of one subframe in the time-axis direction. It is specified in REL8-LTE that 100 resource blocks are allocated to a system band of 20 MHz, and that one resource block is comprised of 12 subcarriers. Further, it is specified that one subframe is a transmission time unit, and is divided into two time slots to transmit data, and that one time slot is comprised of 7 symbols.

Since different CRSs are defined for all four antennas in REL 8-LTE, when the CRSs are assigned to radio resources so that mutually different CRSs are transmitted from four antennas, the pattern is as exemplified in FIG. 3. In addition, FIG. 3 exemplifies the state in which the DM-RS that is newly defined this time is also assigned to radio resources, and the CRSs are arranged so as not to overlap the DM-RSs. The DM-RSs are not subjected to antenna virtualization and transmitted from all four antennas.

Herein, the case is assumed that each of four CRSs multiplexed as shown in FIG. 3 is precoded, and transmission of each CRS is subjected to antenna virtualization (single). The base station performs antenna weighting on four antennas with 1, 1, −1, −1, for example, and it is thereby possible to achieve single antenna virtualization.

Figure 4:
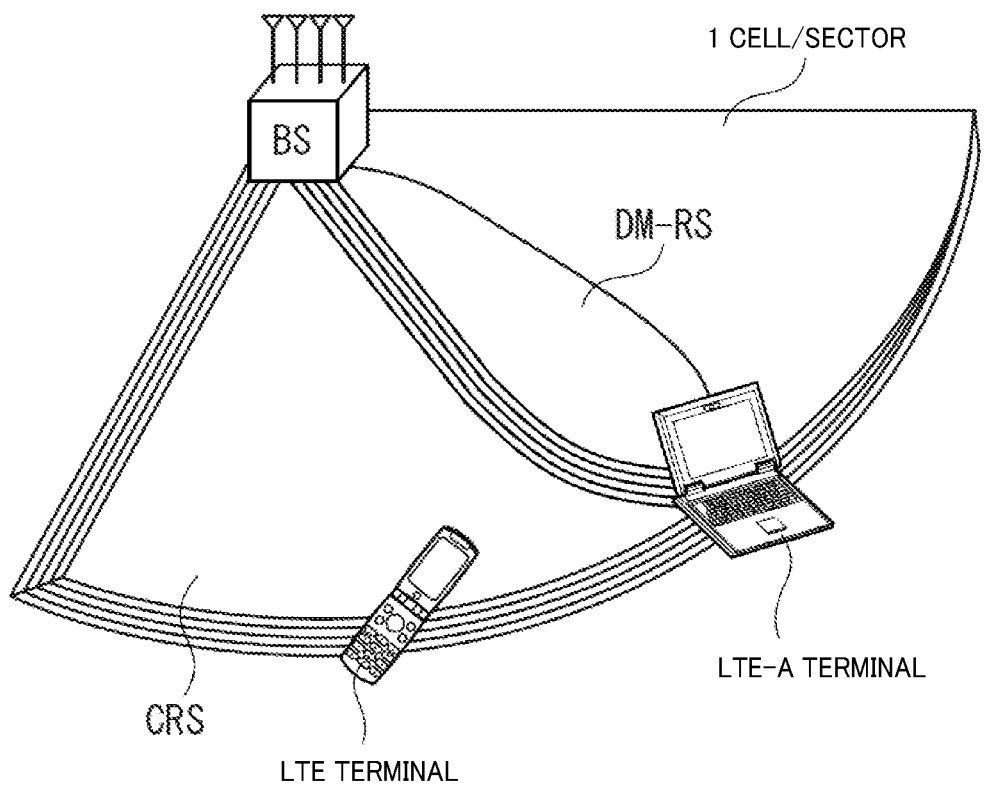
FIG. 4 is a conceptual diagram illustrating a manner in which CRSS corresponding to all the antenna ports are precoded for a single antenna in antenna virtualization and transmitted to the entire cell/sector.

FIG. 4 conceptually shows the manner in which each of different CRSs is precoded, subjected to single antenna virtualization, and transmitted to the entire cell/sector. Each of CRSs precoded for antenna virtualization is transmitted to the entire cell/sector. Further, the DM-RSs are transmitted to the LTE-A terminal from four antennas.

Since four CRSs are subjected to single antenna virtualization, the LTE terminal is capable of demodulating the shared data channel using any of received CRSs, and the LTE-A terminal is capable of demodulating the common control channel using any of received CRSs.

However, as shown in FIG. 3, when four CRSs associated with four antennas are four-multiplexed and DM-RSs are four-multiplexed, there is a problem that overhead is significantly large. The LTE terminal and LTE-A terminal are capable of demodulating the shared data channel or the common control channel by receiving one CRS, and therefore, when four actual antennas are virtually made a single antenna, it is not necessary to transmit three remaining CRSs.

Then, corresponding to the number of antennas in antenna virtualization in one cell/sector, instead of transmitting all the CRSs corresponding to the number of actual antennas, the CRS is transmitted corresponding to the number of antennas in antenna virtualization. By this means, it is possible to reduce the number of CRSS assigned to radio resources, corresponding to the number of antennas in antenna virtualization, and reduce overhead.

Figure 5:
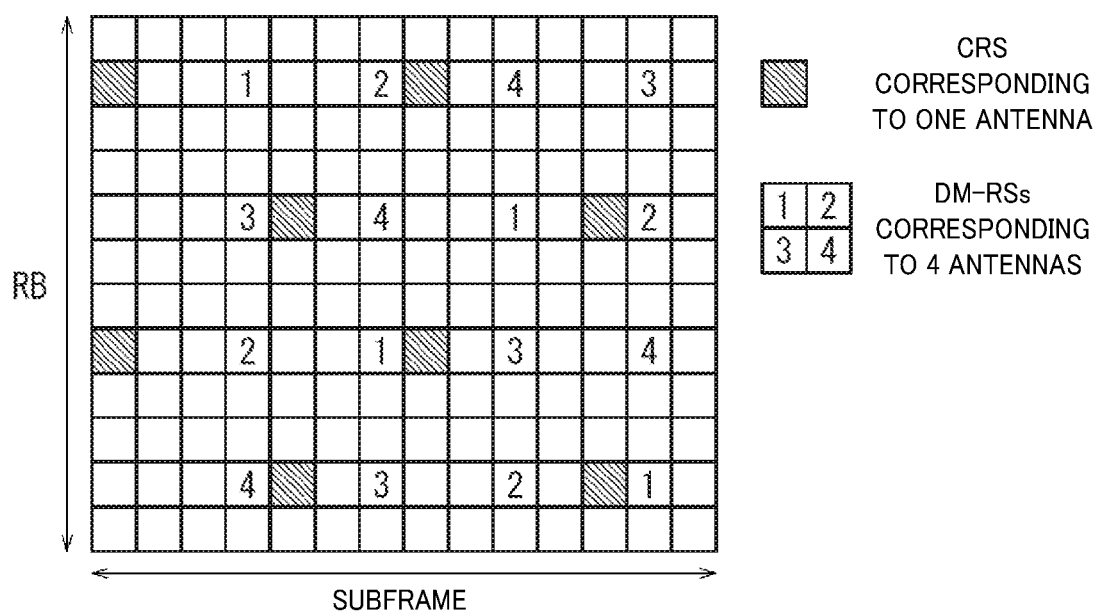
FIG. 5 is a diagram illustrating a state in which CRSS reduced to one antenna port are assigned to radio resources.
Figure 6:
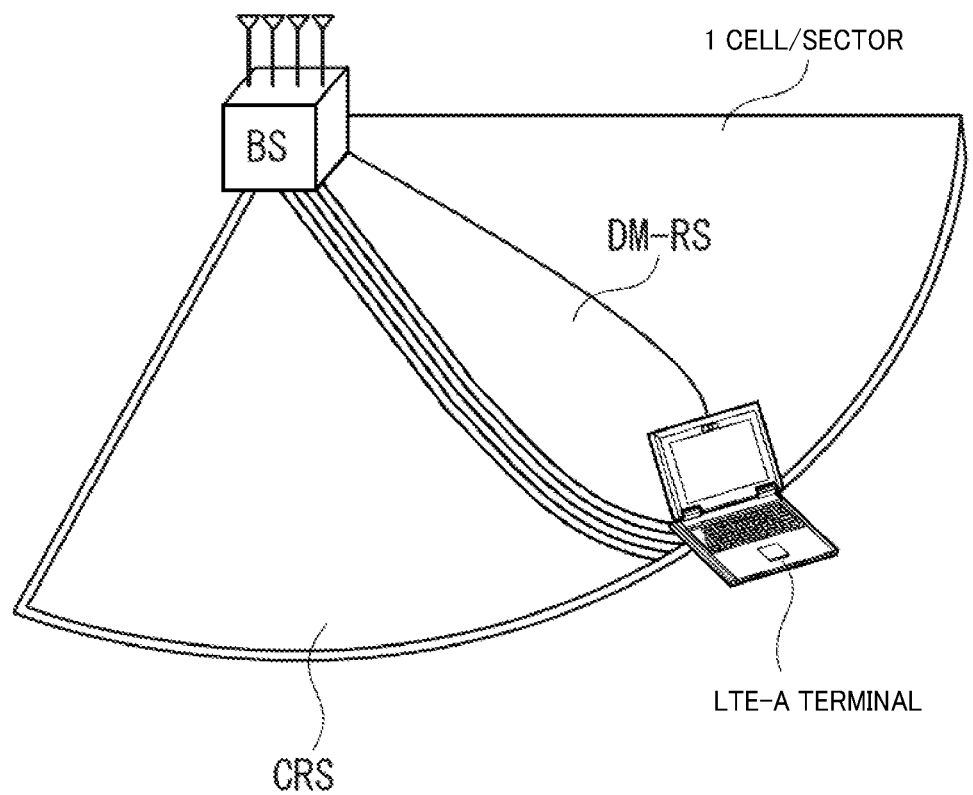
FIG. 6 is a conceptual diagram illustrating a manner in which CRSS of one antenna port are precoded for a single antenna in antenna virtualization and transmitted to the entire cell/sector.

In an example as shown in FIG. 5, corresponding to one antenna in antenna virtualization from four actual antennas as in FIG. 4, one CRS is transmitted from four antennas. The DM-RSs are assigned to the same positions as in FIG. 3. FIG. 6 illustrates the manner in which one CRS is precoded, transmitted from each antenna, and is thereby transmitted by one antenna in antenna virtualization, corresponding to the number (one) of antennas subjected to antenna virtualization. Further, DM-RSs are transmitted to the LTE-A terminal from four antennas.

Figure 7:
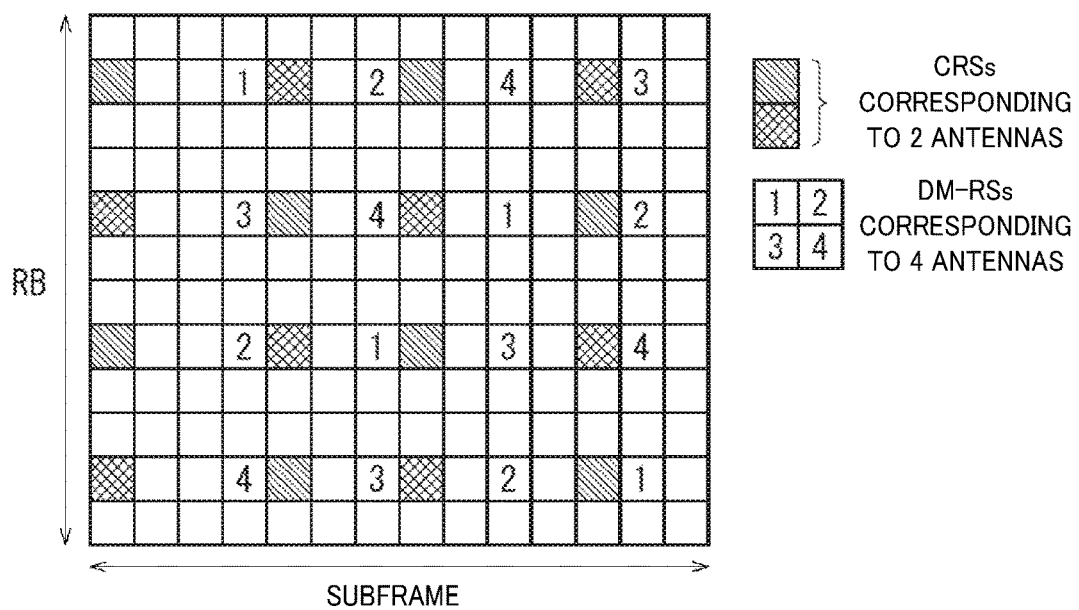
FIG. 7 is a diagram illustrating a state in which CRSS reduced to two antenna ports are assigned to radio resources.
Figure 8:
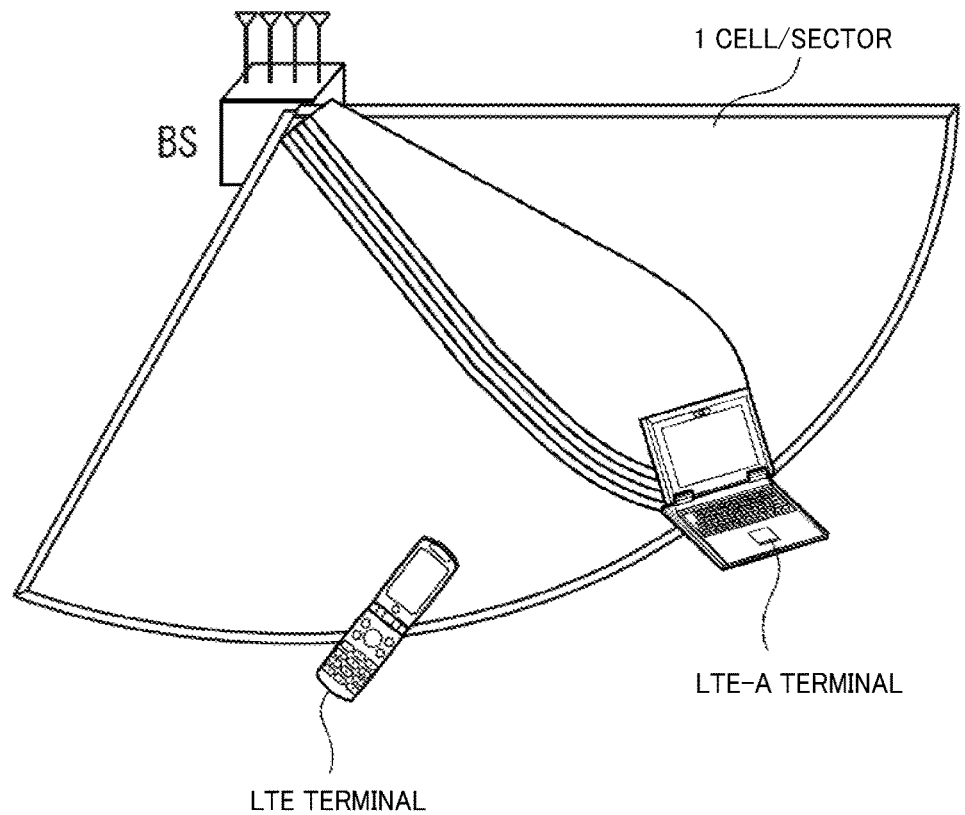
FIG. 8 is a conceptual diagram illustrating a manner in which CRSS of two antenna ports are precoded for a single antenna in antenna virtualization and transmitted to the entire cell/sector.

FIG. 7 is a diagram illustrating radio resource allocation of CRSS when CRS types are reduced to two antenna ports. The DM-RSs are assigned to the same positions as in FIG. 3. Two CRSS corresponding to two antennas are assigned to radio resources. As shown in FIG. 8, two different CRSS are respectively precoded, subjected to single antenna virtualization, and transmitted to the entire cell/sector.

Thus, four antennas are virtually made two antennas by antenna virtualization, the number of CRSs is reduced to two corresponding to the number of antennas in antenna virtualization, and it is thereby possible to apply two-antenna transmission diversity to the shared data channel for the LTE terminal adapted to two-antenna transmission. Further, in communications with the LTE-A terminal, it is possible to apply two-antenna transmission diversity to the control channel.

Figure 9:
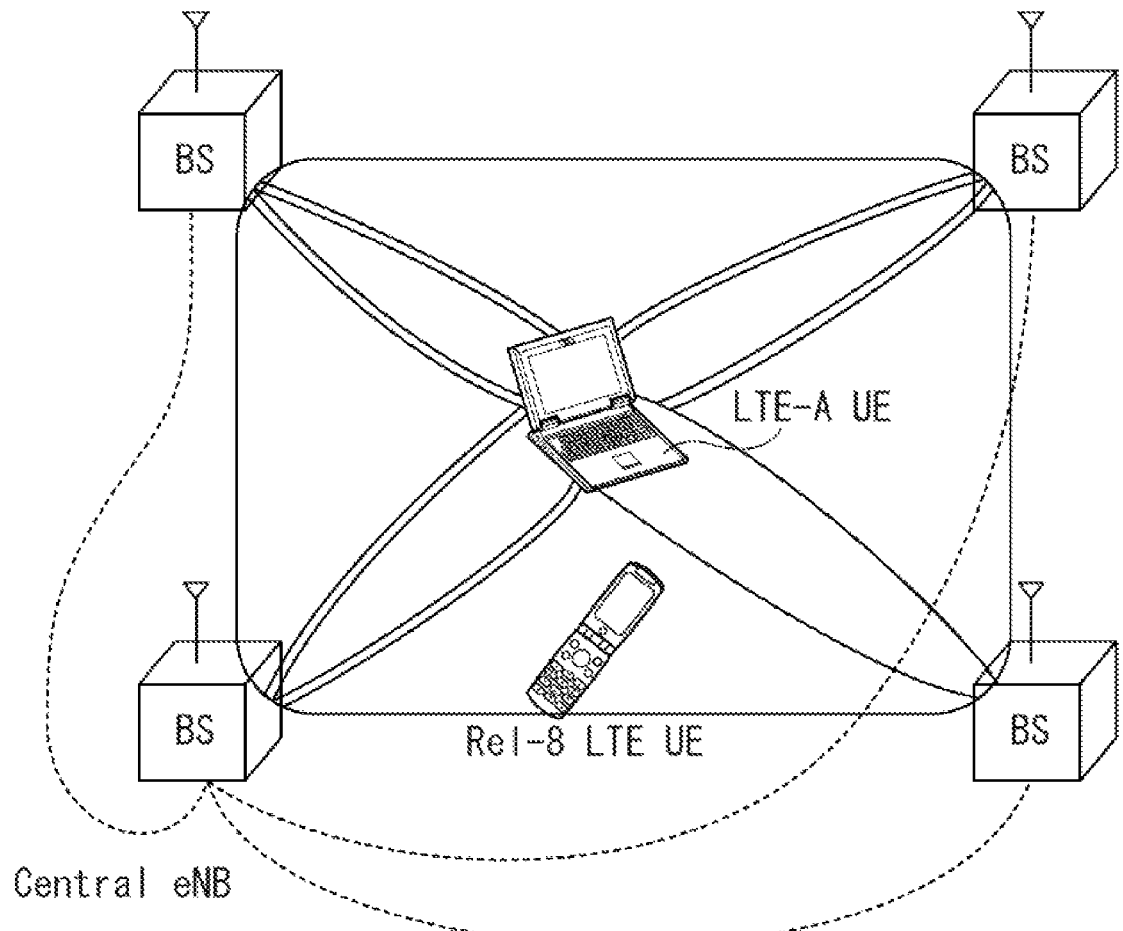
FIG. 9 is a conceptual diagram in the case of applying CRS reduction techniques to a distributed antenna system.

FIG. 9 is a conceptual diagram in the case of applying the CRS reduction techniques to a distributed antenna system.

In the distributed antenna system, a plurality of remote antenna units (base stations BSs) that are distributed graphically and located in one area is connected to one another via communication cables and forms one cell. The distributed base station (BS) has one (or more) antenna(s), and a central apparatus (Central eNB) collectively performs the antenna transmission/reception processing from the plurality of distributed base stations (BSs). For example, MIMO transmission for improving the diversity effect and transmission rate using a plurality of antennas is achieved using a plurality of distributed base stations (BSs).

In the distributed antenna system as shown in FIG. 9, one cell is covered by four transmitters (BSs), and each transmitter (BS) is provided with one transmission antenna. The central apparatus (Central eNB) collectively manages the antenna transmission/reception processing from a plurality of distributed base stations (BSs) to achieve MIMO transmission. In this case, as shown in FIG. 9, when the same CRS is precoded and transmitted to the entire cell from a plurality of distributed base stations (BSs), as compared with the case where different CRSS are transmitted respectively from the distributed base stations (BSs), it is possible to reduce overhead. In FIG. 9, different DM-RSs are transmitted for each antenna (each distributed base station (BS)) to the LTE-A terminal.

Thus, not limited to the case where one base station is provided with a plurality of antennas, also in the distributed antenna system, by transmitting the CRS reduced corresponding to the number of antennas in antenna virtualization, it is possible to similarly obtain the effect of reducing overhead.

FIGS. 10(*a*) and 10(*b*) are diagrams illustrating the CRS structure. FIG. 10(*a*) illustrates the CRS structure up to two antennas that the LTE terminal supports. In the CRS structure as shown in FIG. 9, two different CRSS are alternately assigned to four subcarriers evenly within one symbol and one resource block in the frequency-axis direct ion. Further, the number of symbol s to which the CRS is assigned is four in one subframe. It is desirable that the intervals of symbols to which the CRS is assigned are substantially equal in a subframe. The CRS structure in FIG. 10(*a*) is referred to as "normal structure". The CRSS of such "normal structure" are consecutively assigned for each resource block in the frequency-axis direction.

The base station apparatus precodes each of two different CRSS (normal structure) associated with two antennas as shown in FIG. 10(*a*), and multiplexes CRS over the entire cell/sector to transmit by one-antenna transmission actually from four antennas by antenna virtualization.

FIG. 10(*b*) is of CRS structure up to two antennas, and shows a pattern in which the CRS is assigned to only a first symbol in one subframe in the CRS structure of FIG. 10(*a*). The density of CRS is lower than in the normal structure. The CRS structure of low density as shown in FIG. 10(*b*) is referred to as "low-density structure". Even in two-antenna transmission, by transmitting the CRS of "low-density structure", it is possible to significantly reduce overhead.

Figure 11:
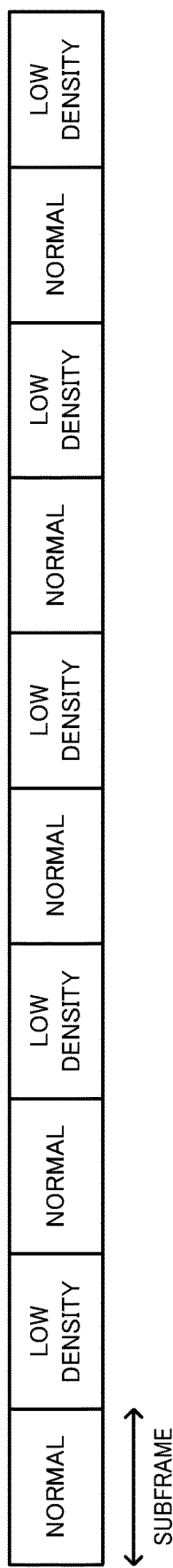
FIG. 11 is a diagram illustrating time division multiplexing transmission of "normal structure" and "low-density structure"

As shown in FIG. 11, the radio base station apparatus may transmit the "normal structure" and the "low-density structure" in time division multiplexing. In this case, it is possible to switch between the normal structure and the low-density structure on a subframe-by-subframe basis to transmit. The LTE terminal is capable of receiving the CRS of "normal structure" and using in demodulation of the shared data channel, but cannot support the CRS of "low-density structure". Therefore, signaling is made to the LTE terminal so that the transmission duration that the CRS of "low-density structure" is transmitted is identified as the duration of MBSFN (Multimedia Broadcast Multicast Service Single Frequency Network) subframe. In the MBSFN scheme, all adjacent base stations use the same scrambling code for the same MBMS, and synchronize the same radio signals to transmit. The LTE terminal does not retrieve the MBSFN subframe, and is capable of continuing the demodulation operation only by the CRS of "normal structure". Meanwhile, the LTE-A terminal is made support both the "normal structure" and the "low-density structure".

Thus, by transmitting the "normal structure" and the "low-density structure" in time division multiplexing, the LTE terminal that supports the "normal structure" receives the CRS of "normal structure" and is capable of demodulating the shared data channel. Meanwhile, the LTE-A terminal receives both the "normal structure" and the "low-density structure" and is capable of demodulating the common/dedicated control channel. Further, the terminal that receives the CRS of "normal structure" and/or the "low-density structure" is capable of measuring RSRP (Reference Signal Received Power) for handover based on the received CRS.

The ratio of the "normal structure" and the "low-density structure" may be switched dynamically corresponding to the system environment. For example, when LTE terminals supporting the "normal structure" are a few, the rate of the CRS of "normal structure" may be decreased, and when the LTE terminal does not exist completely, the CRS of "normal structure" may be not transmitted. In other words, the CRS structures with different densities are capable of permit time division multiplexing, and it is possible to construct the radio access system for controlling the CRS structure to an appropriate density corresponding to the circumstances.

The CQI-RS will specifically be described below.

As described above, in the case of applying antenna virtualization to the CRS, when the number of actual antennas is four, eight or more, it is not possible to use the CRS in channel estimation for each antenna. Further, in the distributed antenna system, since channel estimation for each distributed base station is required, a reference signal for each antenna is needed.

Therefore, aside from the CRS applied to antenna virtualization, it is made possible to perform channel estimation for each antenna using the CQI-RS defined for each antenna and each cell.

The CQI-RS is for channel estimation, and is enough in low density.

Further, in LTE, the sounding reference signal is specified as a reference signal for channel estimation in uplink. As in the uplink sounding reference signal, the CQI-RS is a reference signal to measure channel quality, and therefore, is transmitted at the same density (transmission interval) as that of the uplink sounding reference signal.

Figure 12:
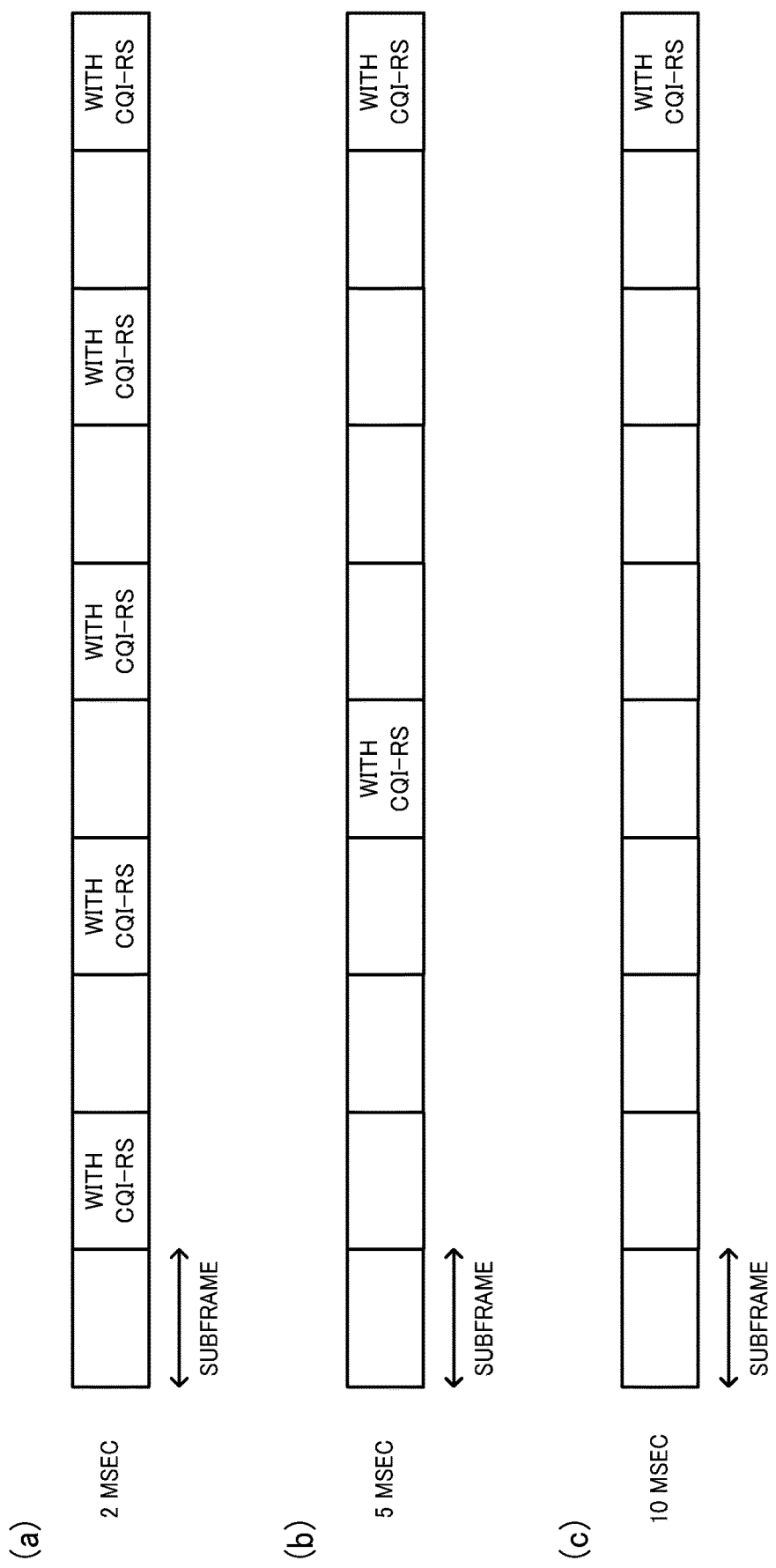
FIG. 12 contains diagrams illustrating transmission intervals of CQI-RS.

More specifically, as shown in FIG. 12(a), transmission is performed at 2 ms (2 TTI) intervals as transmission of the highest density. Further, as in the sounding reference signal, it is configured that the CQI-RS is transmitted once at 5 ms-intervals, while being transmitted once at 10 ms-intervals.

A method of multiplexing the CQI-RS in a subframe will be described below with reference to FIGS. 13(a) and 13(b) and FIG. 14. It is determined that LTE-A supports up to eight antennas, and therefore, it is necessary to transmit eight different CQI-RSs at least in association with eight antennas.

Further, it is desirable that the CQI-RSs are orthogonal for each antenna, and that it is possible to extend to a plurality of cells. In this case, since orthogonalization of eight antennas is required per cell, and it is also necessary to support orthogonalization among cells, it is conceivable that the number of orthogonal reference signals increases for the CQI-RS. Then, the CQI-RS is multiplexed in time division with other symbols so as not to overlap other symbols to which signals except the CQI-RS are assigned.

Figure 13:
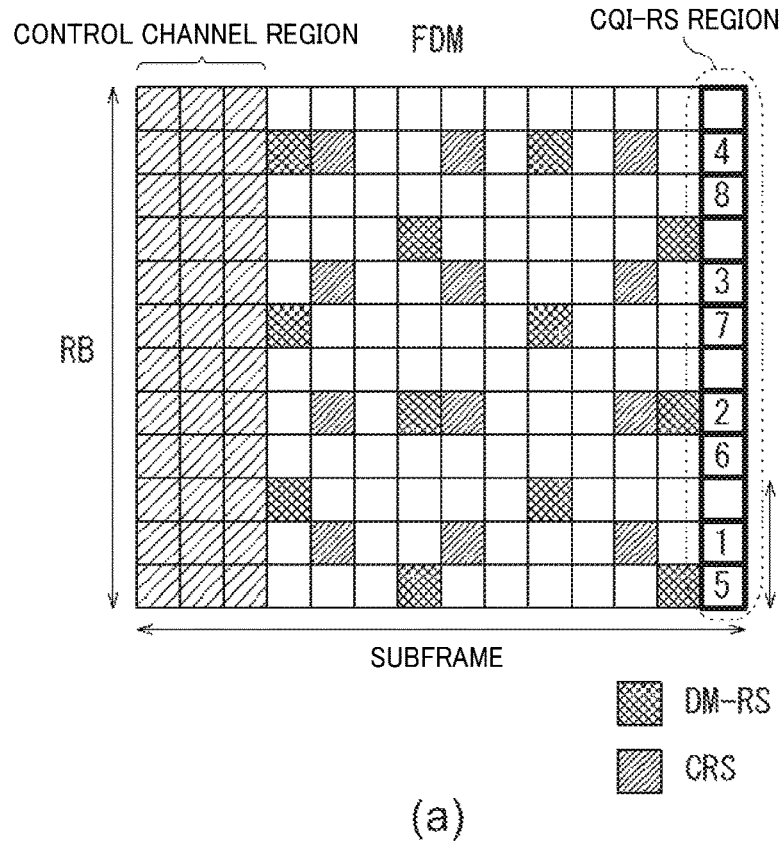
FIG. 13 contains explanatory diagrams for a multiplexing method of multiplexing CQI-RS into a subframe.
Figure 13:
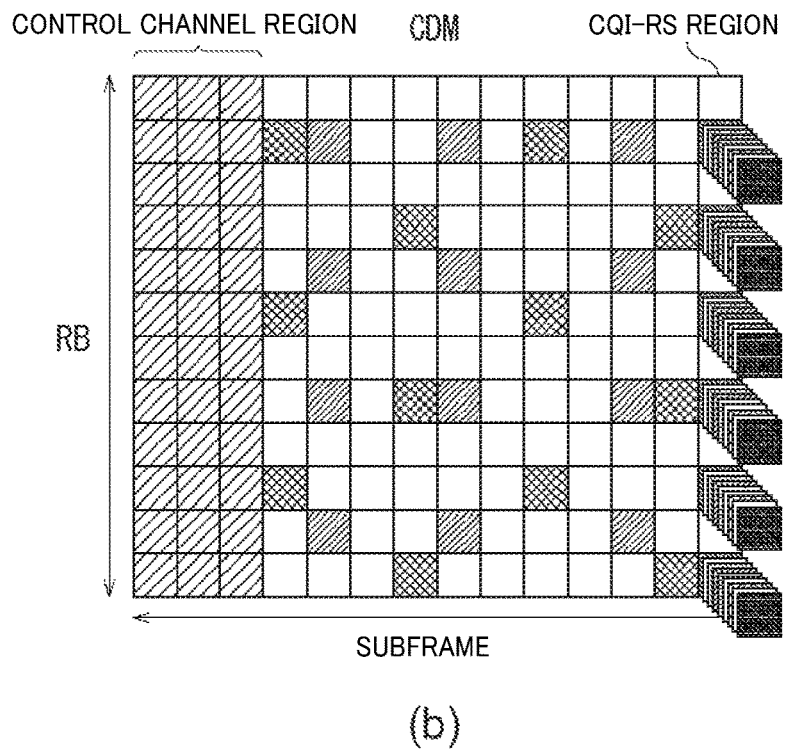

FIG. 13(a) shows an example in which the CQI-RS is multiplexed in time division with other symbols, while being subjected to frequency division multiplexing. In order to support eight antennas, eight CQI-RSs (numbers 1 to 8) are used, and mutually orthogonal signals are used.

In LTE, control channels are assigned to first three symbols of each subframe. FIG. 13(a) shows the case of using one CRS in association with antenna virtualization of virtualizing a plurality of antennas as one antenna. The number (type) of CRSS increases or decreases corresponding to the number of virtualized antennas. Further, as described previously, CRSS are arranged in radio resources equally. Since user-specific reference signals are specified, for example, in LTE, the DM-RS is capable of being assigned to the same position. Symbols to which the CQI-RS is assigned are not limited particularly, unless the symbols overlap other symbols, and it is possible to use the last symbol of a subframe. By using the last symbol of a subframe in transmission of CQI-RS, it is possible to minimize the effect on already specified control channels and CRS and DM-RS defined this time.

FIG. 13(b) shows an example in which each CQI-RS is subjected to code diving multiplexing with other CQI-RSs in a subcarrier to which the CQI-RS is assigned, in addition to multiplexing (TDM on a symbol basis+FDM on a subcarrier basis) of CQI-RS as shown in FIG. 13(a). Thus, by combining three types of multiplexing (TDM+FDM+CDM) in the CQI-RS, it is possible to transmit increased CQI-RSs efficiently.

Figure 14:
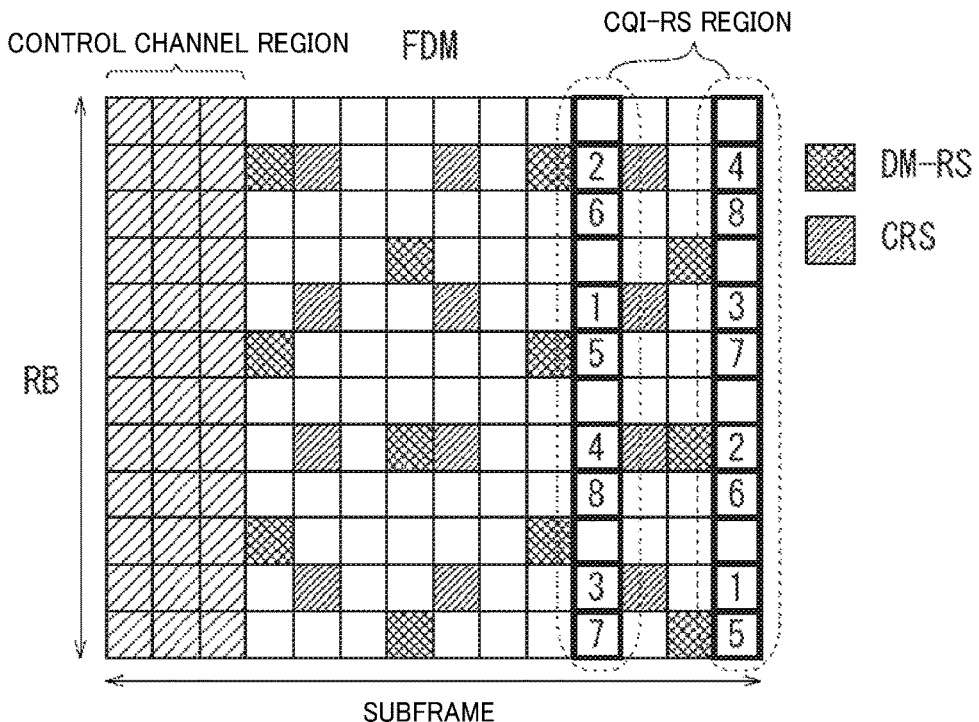
FIG. 14 is another explanatory diagram for the multiplexing method of multiplexing CQI-RS into a subframe.

FIG. 14 shows an example in which the CQI-RS is assigned to a plurality of symbols to perform symbol multiplexing. Eight CQI-RSs corresponding to eight antennas are assigned to the last symbol of a subframe, while being assigned to another symbol to which the CRS and DM-RS are not assigned.

Further, it is possible to further configure eight CQI-RSs multiplexed into two symbols as shown in FIG. 14 as a hybrid type for code division multiplexing as shown in FIG. 13(b). The symbol targeted for code division multiplexing may be two symbols or one of the symbols.

The DM-RS will specifically be described below.

As described previously, in the case of applying antenna virtualization to the CRS, when the number of actual antennas is four, eight or more, it is not possible to use the CRS in demodulation for each antenna. Further, in the distributed antenna system, since demodulation for each distributed base station is required, a reference signal for each antenna is needed. Furthermore, in LTE-A, since it is necessary to support multi-stream, it is required to determine the density of DM-RS in consideration of multi-stream. Still furthermore, it is necessary to ensure orthogonality between streams in the case of extending to multi-stream.

Therefore, aside from the CRS applied to antenna virtualization, it is made possible to perform demodulation for each antenna using the DM-RS defined for each antenna and each cell.

Reference signals used in demodulation of the common data channel as in the DM-RS are specified in REL8-LTE, and therefore, the basic structure of the DM-RS is made the same as the user-specific reference signal specified in REL8-LTE.

Figure 15:
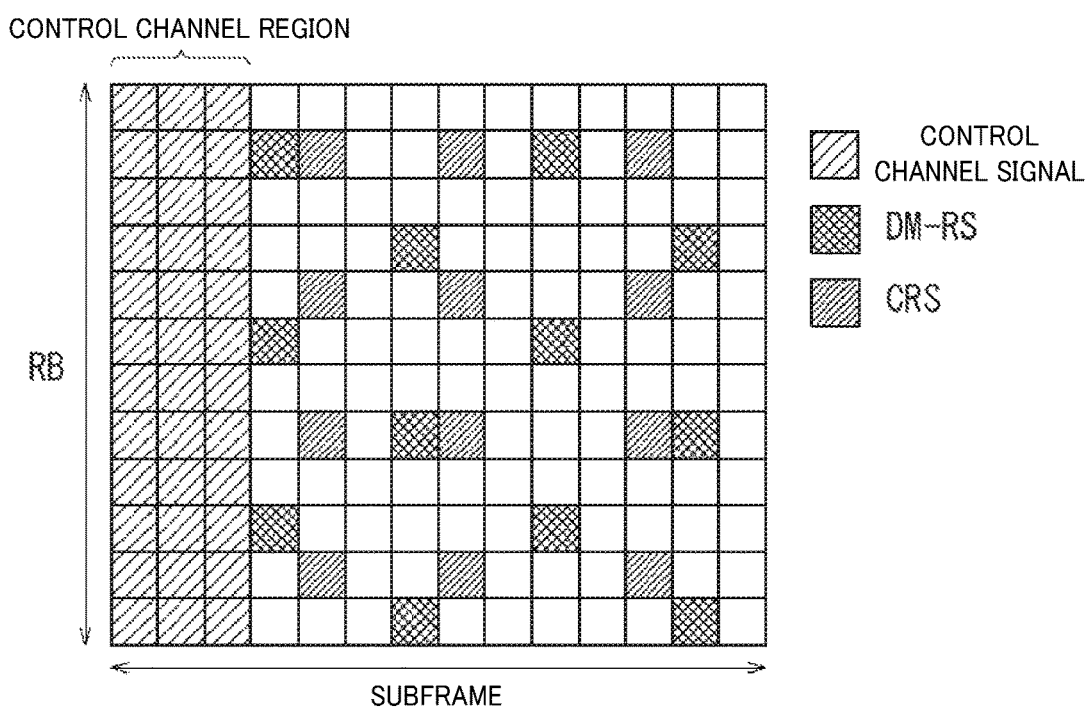
FIG. 15 is a diagram illustrating DM-RS assigned in the same way as in a user-specific reference signal specified in REL8-LTE.

FIG. 15 illustrates DM-RSs assigned in the same way as in the user-specific reference signal specified in REL8-LTE. First three symbols of one subframe are assigned to the control channel, and in the remaining regions, in order not to overlap the CRS, the DM-RS is assigned to total 12 resource elements in the 4th symbol, 7th symbol, 10th symbol and 13th symbol, while being subjected to frequency multiplexing for each symbol.

Described first is the optimal density of DM-RS for data transmission in a single stream. Also in this case, the density of DM-RS is determined in consideration of the case of extending to multi-stream.

Figure 16:
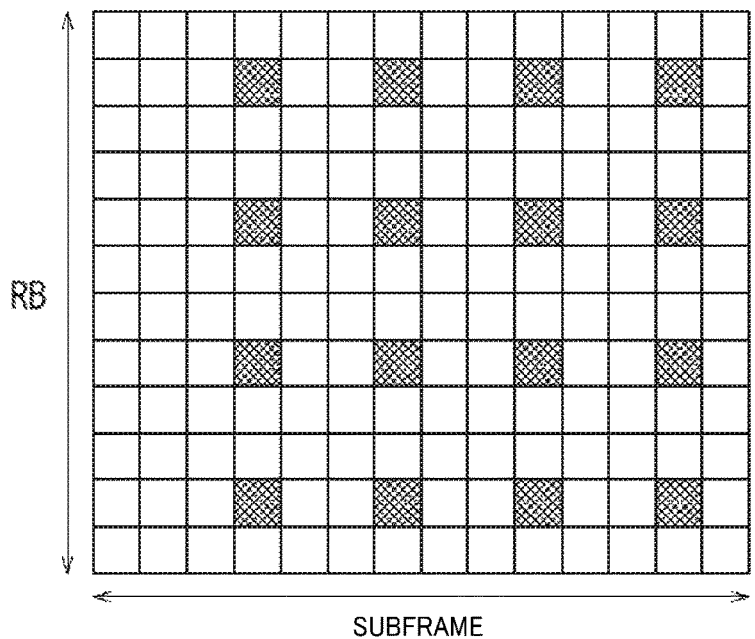
FIG. 16 contains diagrams exemplifying the density of DM-RS most suitable for data transmission in a single stream.
Figure 16:
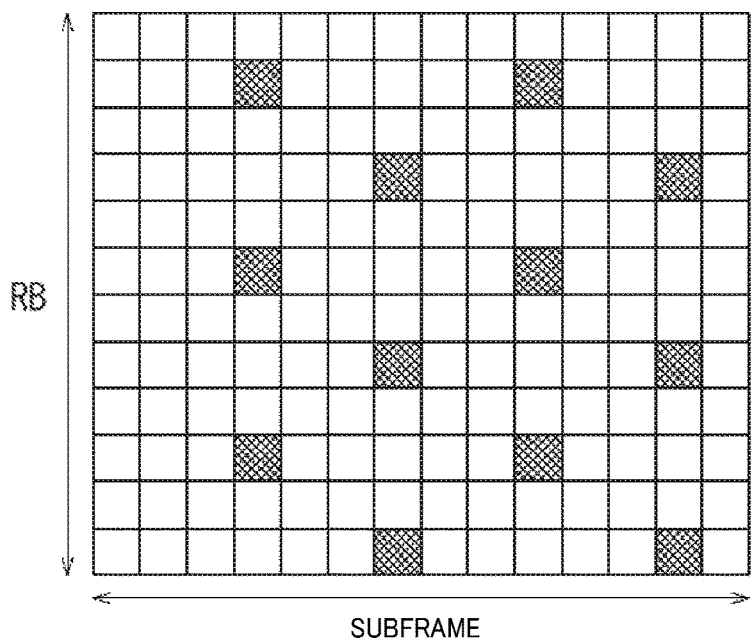
Figure 17:
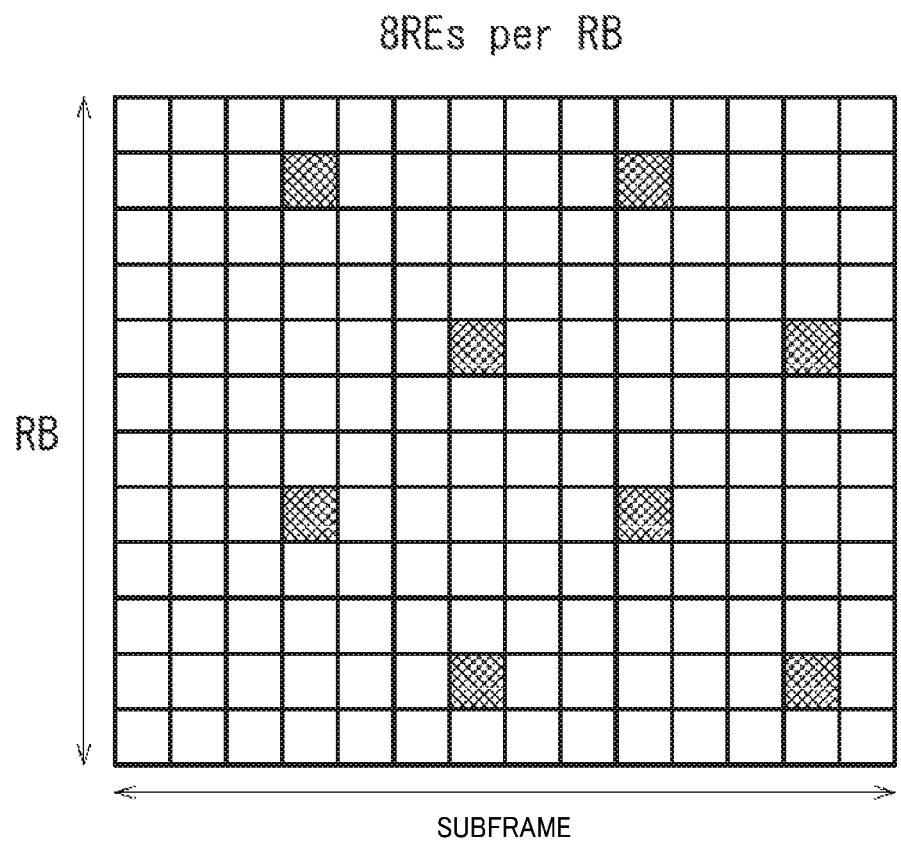
FIG. 17 is another diagram illustrating the density of DM-RS most suitable for data transmission in a single stream.

FIG. 16(a) shows an example of multiplexing the DM-RS at the density of 16 resource elements per resource block (subframe). FIG. 16(b) shows an example of multiplexing the DM-RS at the density of 12 resource elements per resource block (subframe). FIG. 17 shows an example of multiplexing the DM-RS at the density of 8 resource elements per resource block (subframe).

In FIGS. 16(a) and 16(b) and FIG. 17, the densities of DM-RS are different from one another, but in any case, the symbol positions to assign the DM-RS are common, and the 4th symbol, 7th symbol, 10th symbol and 13th symbol. The symbol positions are also common in the user-specific reference signal specified in REL8-LTE. Meanwhile, the arrangement in a symbol of DM-RSs assigned to each symbol is made so that the DM-RSs are distributed equally in the frequency domain. Further, as shown in FIG. 16(b) and FIG. 17, it is also desirable that the DM-RSs are arranged so that mapping positions in the frequency domain do not overlap among symbols, from the viewpoint of equalization.

Thus, with respect to a single stream, it is desirable that the density is optimized by varying the density of DM-RS arranged in one resource block (one subframe) with symbols to which the DM-RS is assigned being common (also common in the user-specific reference signal specified in REL8-LTE).

Described next is the optimal density of DM-RS for data transmission in multi-stream.

Figure 18:
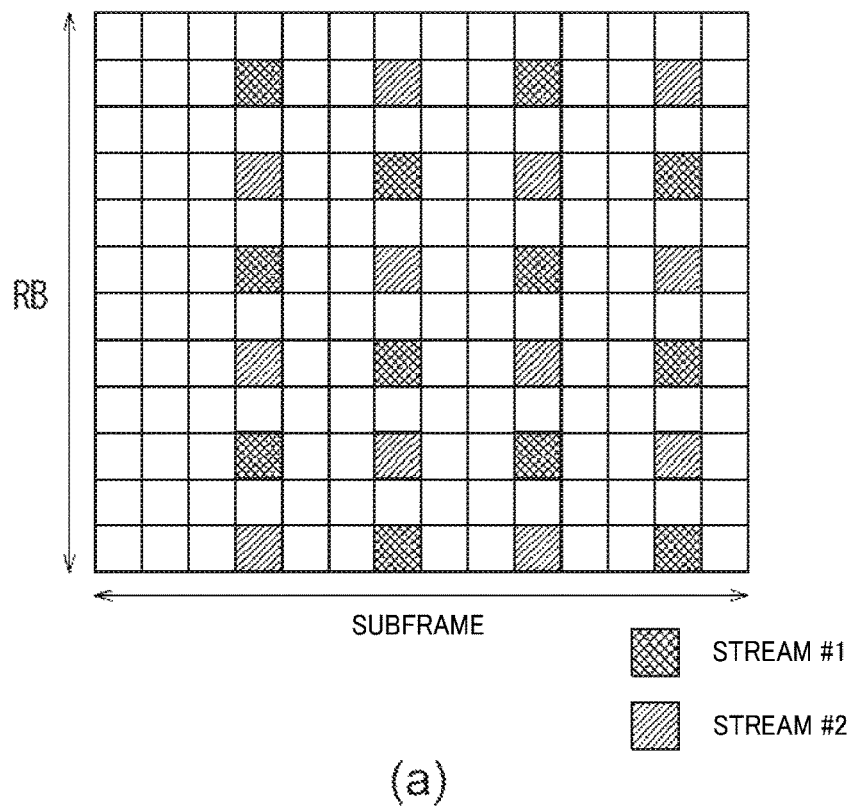
FIG. 18 contains diagrams illustrating DM-RS arrangements most suitable for data transmission in multi-stream.
Figure 18:
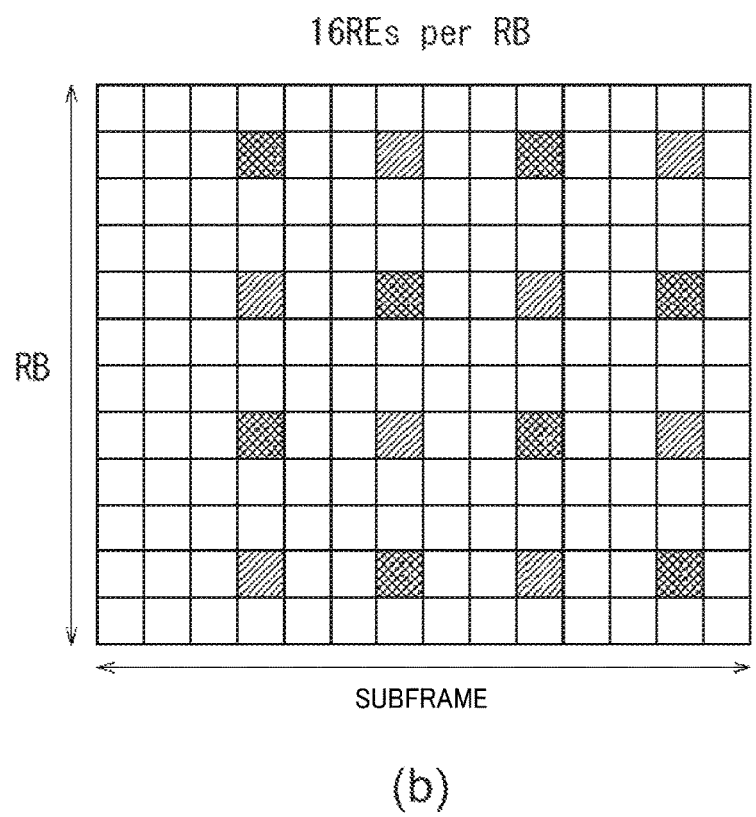

FIGS. 18(a) and 18(b) illustrate the optimal DM-RS arrangement for data transmission in multi-stream. FIG. 18(a) is an example in which DM-RSs of first stream #1 and second stream #2 are multiplexed at the density of 24 resource elements per one resource block (one subframe). Further, FIG. 18(b) is an example in which DM-RSs of first stream #1 and second stream #2 are multiplexed at the density of 16 resource elements per one resource block (one subframe). The densities are different, but DM-RSs of first stream #1 and DM-RSs of second stream #2 are assigned to common symbols. The symbol positions are the 4th symbol, 7th symbol, 10th symbol and 13th symbol, and are also common in the user-specific reference signal specified in REL8-LTE. Further, the arrangement in a symbol of DM-RSs of a different stream assigned to the same symbol is made so that the DM-RSs are distributed equally in the frequency domain.

Thus, with respect to multi-stream, it is desirable to configure so that the density is optimized by varying the density of DM-RS arranged in one resource block (one subframe) corresponding to the number of transmission data streams, with symbols to which the DM-RS is assigned being common (also common in the user-specific reference signal specified in LTE).

Further, in the case of multi-stream, DM-RSs are orthogonalized between streams and transmitted. As the technique of orthogonalizing DM-RSs between streams, it is possible to use FDM, CDM and combination thereof.

Figure 19:
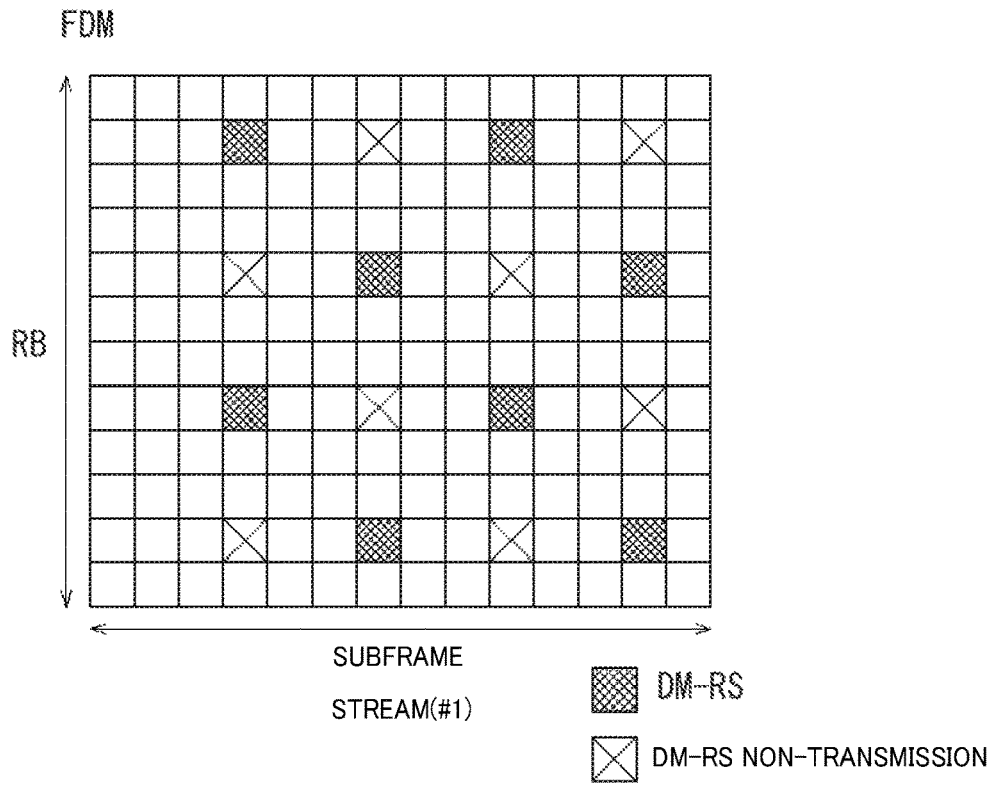
FIG. 19 contains conceptual diagrams of orthogonalization among streams of DM-RS by FDM.
Figure 19:
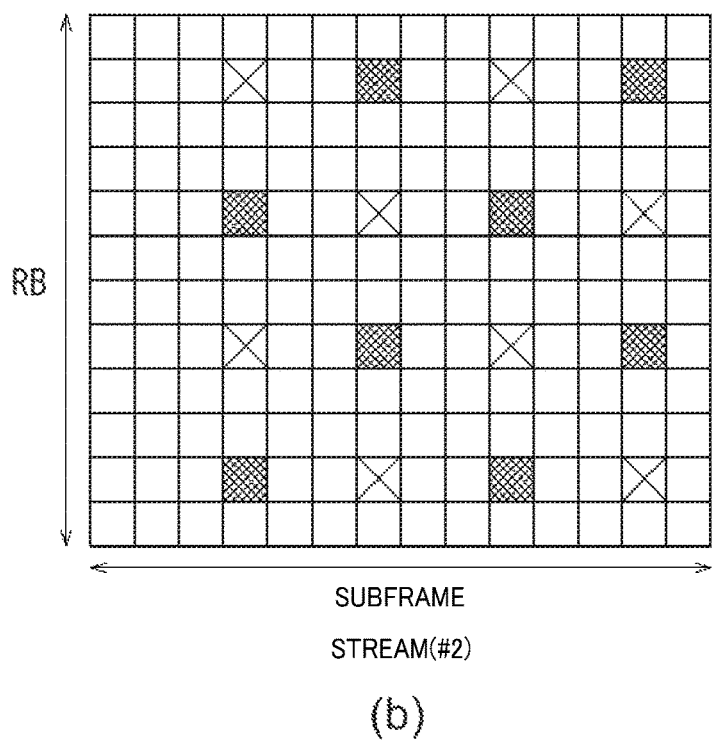

FIGS. 19(a) and 19(b) show the concept of orthogonalization of DM-RS between streams by FDM. FIGS. 19(a) and 19(b) are of an example of orthogonalizing multi-stream (#1, #2) transmission of DM-RS shown in FIG. 18(b) by FDM. FIG. 19(a) illustrates the structure of DM-RS of first multi-stream #1, and indicates that resource elements shown by "x" do not transmit signals of the first stream. FIG. 19(b) illustrates the structure of DM-RS of second multi-stream #2, and indicates that resource elements shown by "x" do not transmit signals of the second stream.

Common symbols (4th symbol, 7th symbol, 10th symbol and 13th symbol) are assigned in the first stream #1 and second stream #2, and in each of the common symbols, it is configured that a subcarrier that transmits the DM-RS of the first stream #1 does not transmit the DM-RS in the second stream #2.

By this means, in transmitting the downlink reference signal (DM-RS) in multi-stream transmission, since it is configured that the same subcarrier of the same symbol for transmitting the DM-RS in one of streams does not transmit the signal in the other stream, interference does not occur between streams, and it is possible to actualize extremely high orthogonality.

Figure 20:
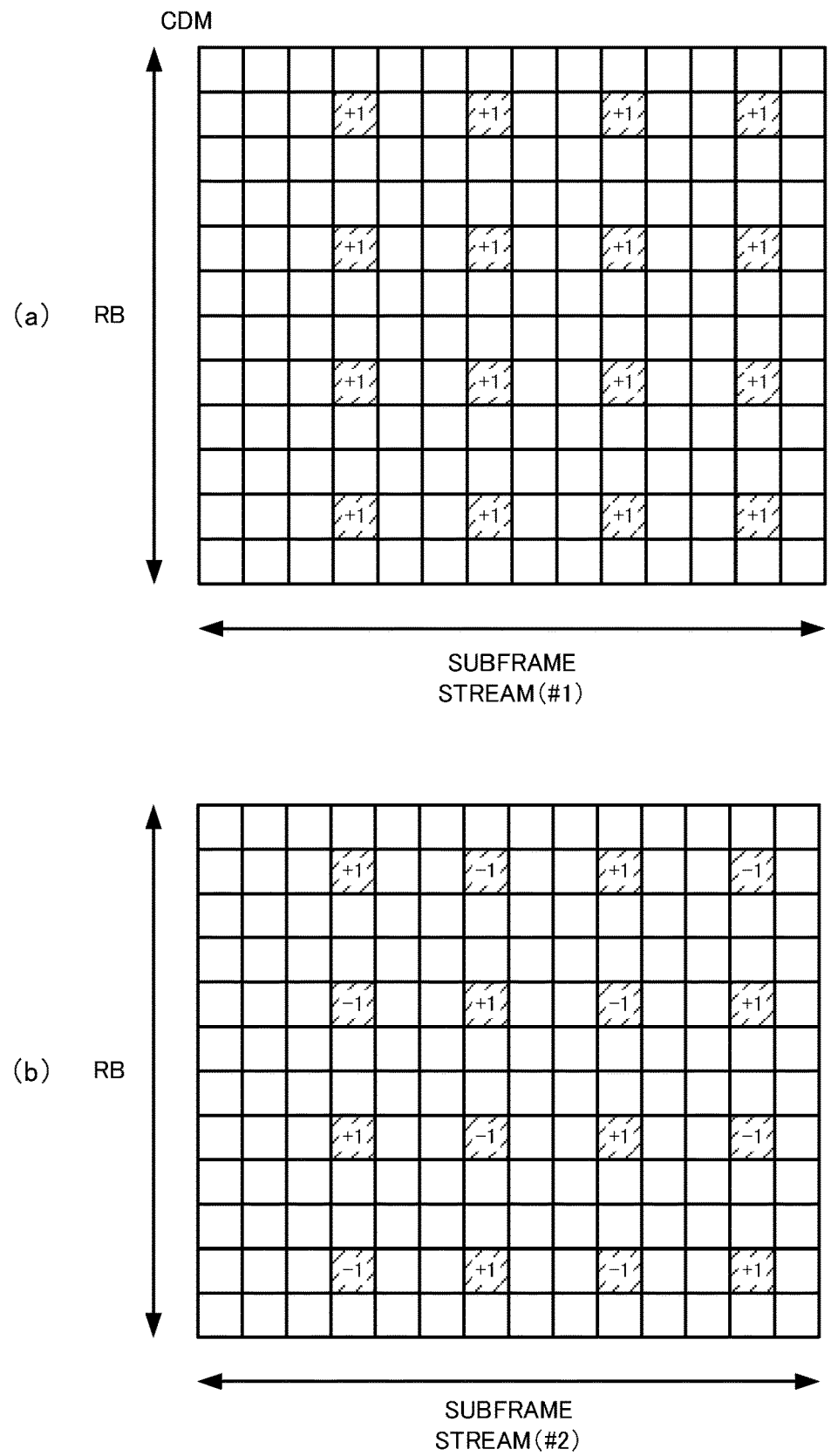
FIG. 20 contains conceptual diagrams of orthogonalization among streams of DM-RS by CDM.

FIGS. 20(a) and 20(b) show the concept of orthogonalization of DM-RS between streams by CDM. FIG. 20(a) illustrates the arrangement of DM-RSs of the first stream #1 and two-dimensional orthogonal codes to code the DM-RSs. The DM-RSs of the first stream #1 shown in FIG. 20(a) are equally arranged at the density of 16 resource blocks per one resource block (one subframe). It is possible to use two-dimensional Walsh codes as the two-dimensional orthogonal codes used in coding of DM-RS of the first stream #1. The two-dimensional Walsh codes shown in FIG. 20(a) are 4×4 Walsh codes in accordance with the DM-RS structure, and as shown in FIG. 20(a), all of the coefficients are set at "+1". In other words, it represents that the DM-RSs of the first stream #1 multiplied by the two-dimensional Walsh codes as shown in FIG. 20(a) do not change.

Meanwhile, FIG. 20(b) illustrates the arrangement of DM-RSs of the second stream. #2 and two-dimensional orthogonal codes to code the DM-RSs. The DM-RSs of the second stream #2 shown in FIG. 20(b) are equally arranged in the same resource elements as in the first stream #1 at the same density as in the first stream #1. The two-dimensional Walsh codes of the same size as in the first stream #1 are used as the two-dimensional orthogonal codes used in coding of DM-RS of the second stream #2, and as shown in FIG. 20(b), adopt the configuration that "+1" and "−1" are alternately set in the time-axis direction and frequency-axis direction. In other words, when the first stream #1 and second stream #2 that are coded using two-dimensional Walsh codes that are orthogonal codes as shown in FIGS. 20(a) and 20(b) are added in the time-axis direction or frequency-axis direction, signals of the paired stream are canceled, interference does not occur between streams, and it is possible to actualize extremely high orthogonality.

Thus, by performing code division multiplexing among a plurality of streams, it is possible to overlap and place the DM-RSs of a plurality of streams in the same resource elements (the same subcarriers of the same symbol) in radio resources, and it is thereby possible to increase the density of DM-RS in each stream. As a result, it is possible to track fading variations in the time-axis direction and channel variations in the frequency-axis direction at high speed, and it is possible to actualize remarkably high reception quality.

In addition, FIGS. 20(a) and 20(b) show the example of using two-dimensional Walsh codes as two-dimensional orthogonal codes, and other two-dimensional orthogonal codes are applicable similarly.

Described next are Embodiments of a radio communication method using the above-mentioned downlink reference signals (CRS, CQI-RS, DM-RS) and radio base station apparatus and radio terminal to which such a radio communication method is applied. Hereinafter, a radio access system intended for LTE and LTE-A will be described, but application to other systems is not limited.

Figure 1:
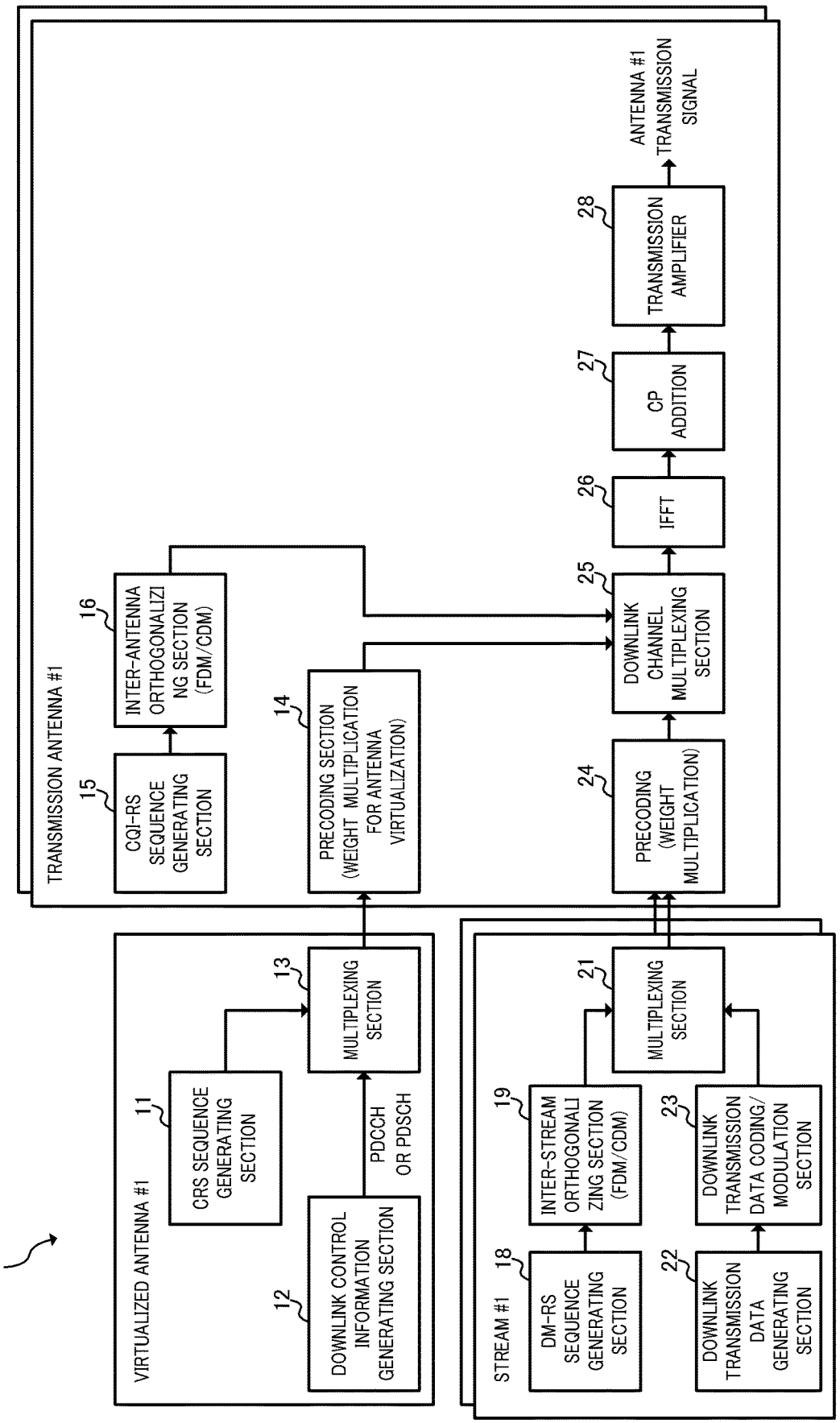
FIG. 1 is a block diagram of a transmission series of a base station apparatus according to an Embodiment.
Figure 2:
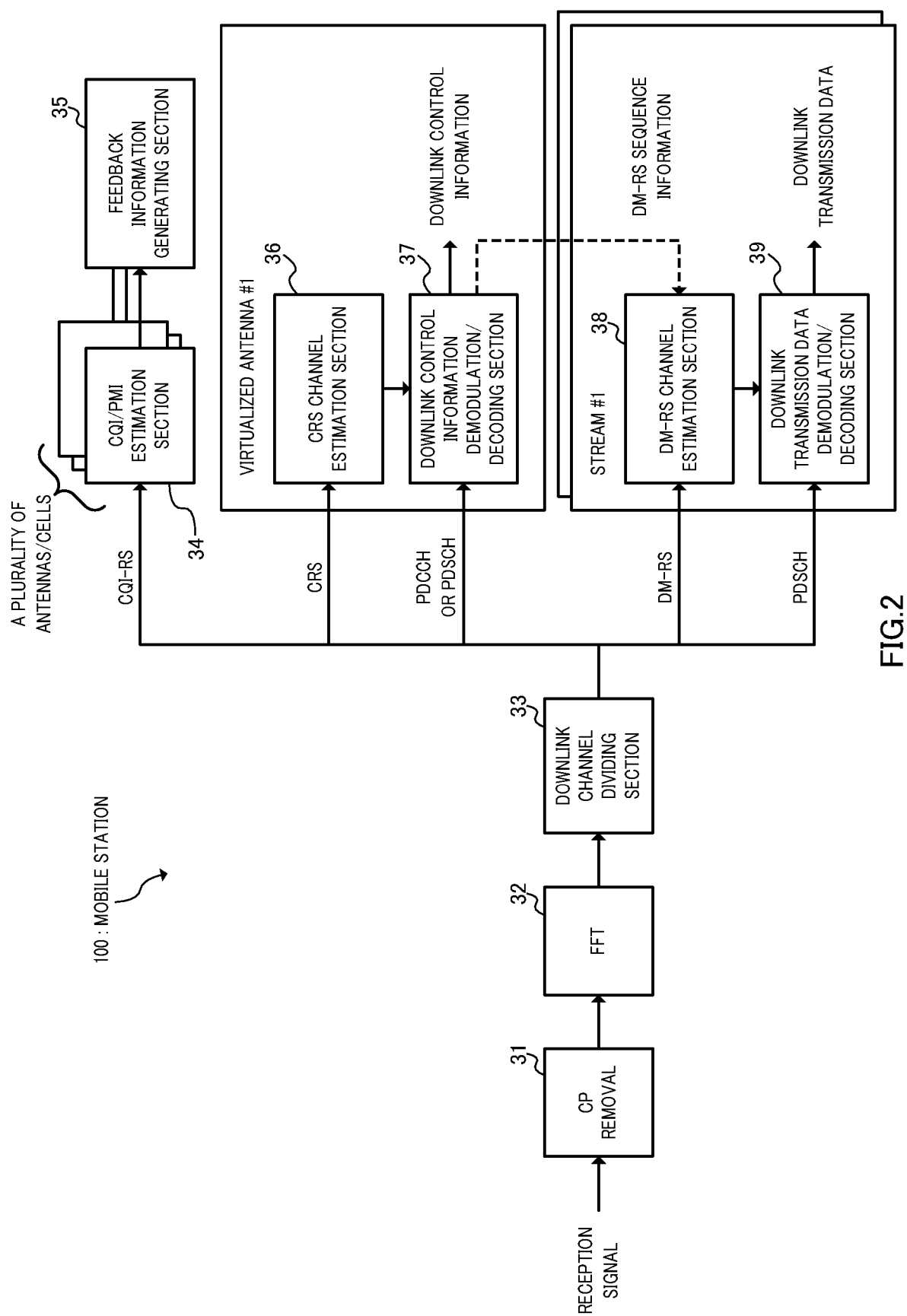
FIG. 2 is a block of a reception series of a mobile station apparatus according to the Embodiment.
Figure 21:
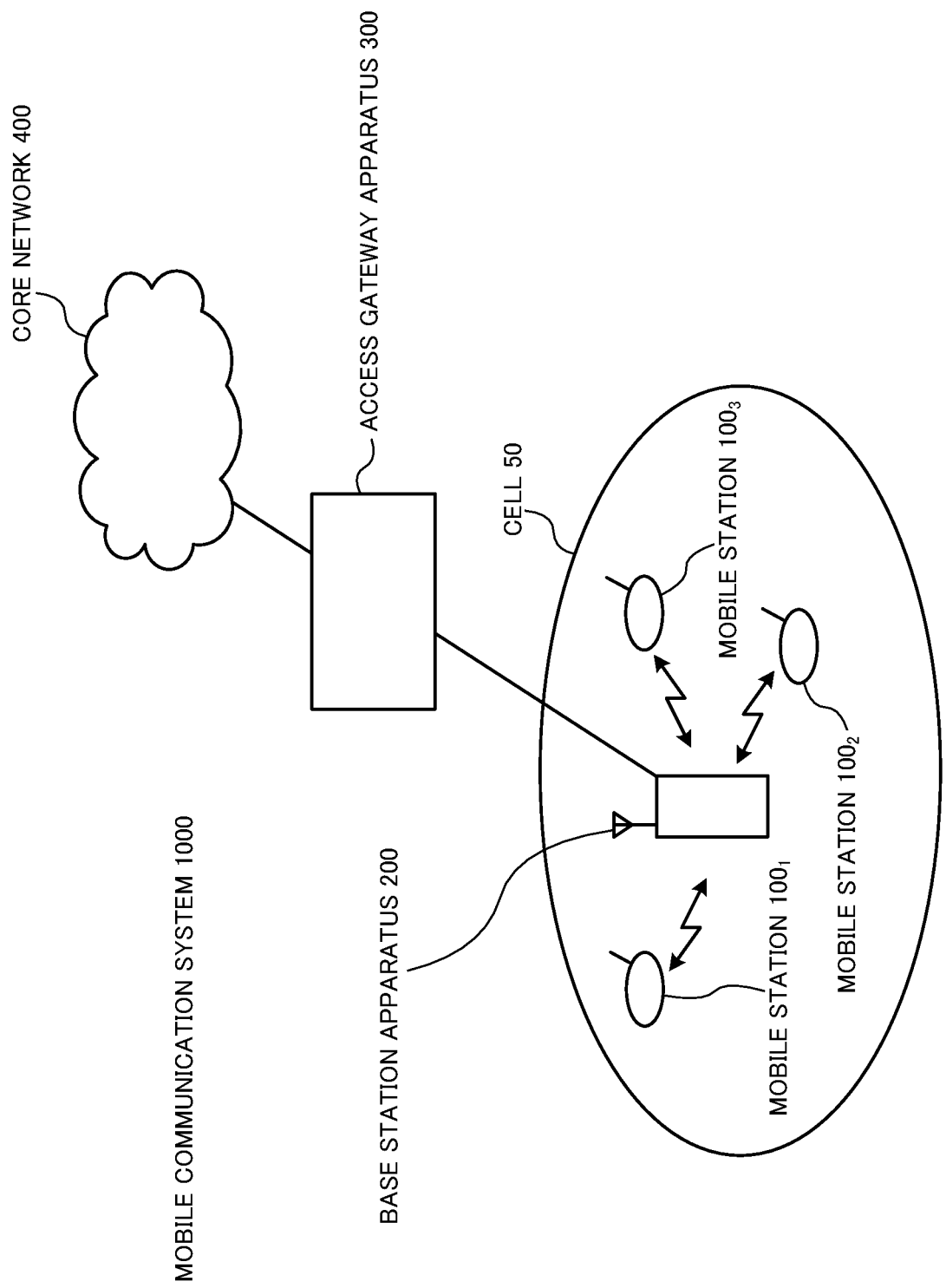
FIG. 21 is a conceptual diagram of an LTE-based system.

FIG. 1 is a functional block diagram of the base station apparatus, and mainly shows a transmission function configuration of a baseband processing section. FIG. 2 is a functional block diagram of the mobile station, and mainly shows a reception function configuration of a baseband processing section. A mobile communication system having the mobile stations and base station apparatus will be described with reference to FIG. 21, before describing the functions of the base station apparatus and mobile station.

A mobile communication system 1000 is based on the LTE system, where the radio communication method using the CRS, CQI-RS and DM-RS as downlink reference signals is applied. The mobile communication system 1000 is provided with a base station apparatus 200 and a plurality of mobile stations 100 ($100_1$, $100_2$, $100_3$, ..., $100_n$, n is an integer where n>0) that communicates with the base station apparatus 200. The base station apparatus 200 is connected to an upper station, for example, access gateway apparatus 300, and the access gateway apparatus 300 is connected to a core network 400. The mobile station $100_n$ communicates with the base station apparatus 200 in a cell 50 by LTE. In addition, the access gateway apparatus 300 may be also referred to as MME/SGW (Mobility Management Entity/Serving Gateway).

In the following description, each mobile station ($100_1$, $100_2$, $100_3$, ..., $100_n$) has the same configuration, function and state, and is descried as the mobile station $100_n$ below to give an explanation unless otherwise specified. For convenience in description, the mobile station performs radio communications with the radio base station, and more generally, may be user equipment (UE) including a mobile terminal and a fixed terminal.

In the mobile communication system 1000, as a radio access scheme, OFDMA (Orthogonal Frequency Division Multiplexing Access) is applied in downlink, while SC-FDMA (Single-Carrier Frequency Division Multiple Access) is applied in uplink. As described above, OFDMA is a multicarrier transmission system for dividing a frequency band into a plurality of narrow frequency bands (subcarriers), and mapping data to each subcarrier to perform communications. SC-FDMA is a single-carrier transmission system for dividing the system band into bands comprised of one or more consecutive resource blocks for each terminal so that a plurality of terminals uses mutually different bands, and thereby reducing interference among the terminals.

Described herein are communication channels in the LTE system. In downlink, used are reference signals for transmitting the CRS, CQI-RS ad DM-RS that are reference signals newly defined this time, the Physical Downlink Shared Channel (PDSCH) shared among the mobile stations $100_n$, and the Physical Downlink Control Channel (Downlink L1/L2 control channel). By the reference signals, the CRS, CQI-RS and DM-RS are transmitted by applying the above-mentioned multiplexing method. On the Physical Downlink Shared Channel are transmitted signals of user data. On the Physical Downlink Control Channel is notified DM-RS sequence information, scheduling information, user IDs to perform communications using the Physical Downlink Shared Channel and information of the transport format of the user data i.e. Downlink Scheduling Information, user IDs to perform communications using the Physical Uplink Shared Channel and information of the transport format of the user data i.e. Uplink Scheduling Grant, etc. In the DM-RS sequence information, more specifically, in the case where DM-RSs are defined by indexes from stream 1 to stream 8, which index is used is notified by the PDCCH or signaling of the upper layer in the case of applying single-stream transmission.

In the case of applying multi-stream transmission, indexes of other users multiplexed in the same resource block are also notified by control signals.

Further, in downlink, broadcast channels are transmitted such as the Physical-Broadcast Channel (P-BCH) and Dynamic Broadcast Channel (D-BCH). The information transmitted on the P-BCH is Master Information Block (MIB), and the information transmitted on the D-BCH is System Information Block (SIB). The D-BCH is mapped to the PDSCH, and is transmitted to the mobile station $100_n$ from the base station apparatus 200.

In uplink, used are the Physical Uplink Shared Channel (PUSCH) shared among the mobile stations 100, and the Physical Uplink Control Channel (PUCCH) that is a control channel in uplink. The user data is transmitted on the Physical Uplink Shared Channel. On the Physical Uplink Control Channel is transmitted precoding information for downlink MIMO transmission, acknowledgement information in response to the shared channel in downlink, radio quality information (COI: Channel Quality Indicator) of downlink, etc.

In addition, in uplink, the Physical Random Access Channel (PRACH) for initial connection, etc. is defined. The mobile station 100 transmits a random access preamble on the PRACH.

The base station apparatus 200 according to the Embodiment of the invention will be described below with reference to FIG. 1.

The base station apparatus 200 according to this Embodiment is provided with a plurality of transmission antennas #1 to #N, precodes the CRS to transmit from each transmission antenna, and is thereby capable of performing transmission by the number of virtualized antennas smaller than the number of actual antennas. Herein, for convenience in description, the description is given with the number of actual antennas assumed to be eight.

The base station apparatus 200 generates the downlink control information and CRS for each virtualized antenna, generates the downlink transmission data and DM-RS for each stream, generates the CQI-RS for each transmission antenna, and multiplexes the signals in downlink channels for each transmission antenna.

The base station apparatus 200 is provided with a CRS sequence generating section 11 that generates the CRSS corresponding to the number of virtualized antennas, a downlink control information generating section 12 that generates downlink control information, and a multiplexing section 13 that multiplexes the CRSS generated in the CRS sequence generating section 11 and the downlink control information generated in the downlink control information generating section 12 onto radio resources (time resources and frequency resources).

The CRS sequence generating section 11 generates CRSS #1 to #8 in a one-to-one correspondence with actual antennas #1 to #8 when antenna virtualization is not performed. Meanwhile, when antenna virtualization is performed, the section 11 generates CRSS corresponding to the number of virtualized antennas. In this Embodiment, when the number of virtualized antennas is "1", CRSs #1 and #2 corresponding to two antennas are transmitted by the virtualized antenna, and by setting the number of CRSS in a one-to-one correspondence with the number of virtualized antennas, it is possible to reduce overheat by maximum amounts.

Thus, the CRS sequence generating section 11 is capable of dynamically varying the number of CRSS to generate corresponding to the number of virtualized antennas (the minimum value is "0".) The number of virtualized antennas can be notified to the CRS sequence generating section 11 from the upper layer.

Figure 10A:
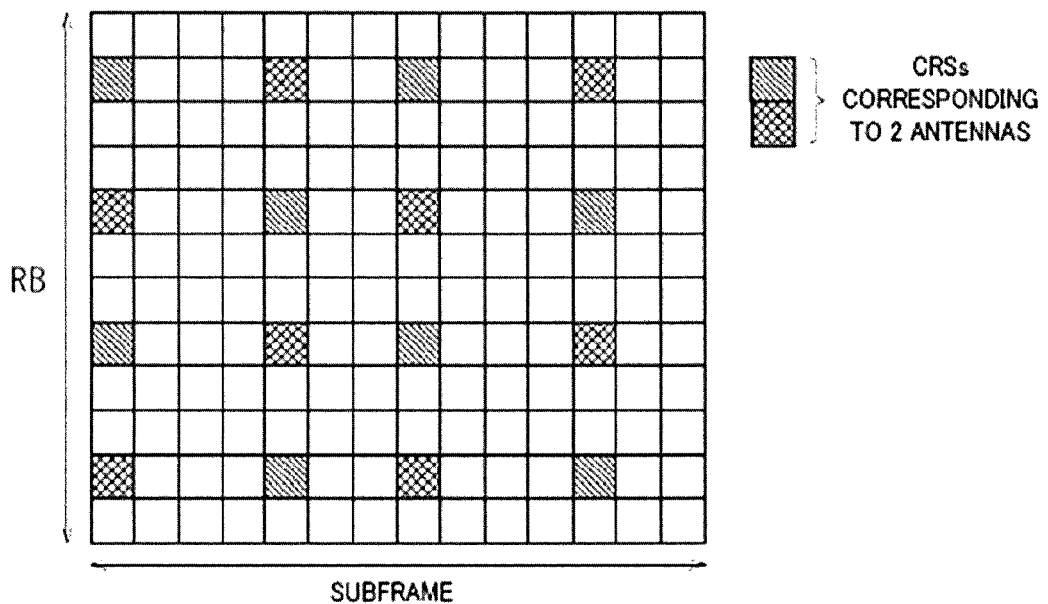
FIG. 10(a) is a diagram illustrating a pattern in which CRSS are assigned to a plurality of symbols in one subframe in high-density CRS structure.
Figure 10B:
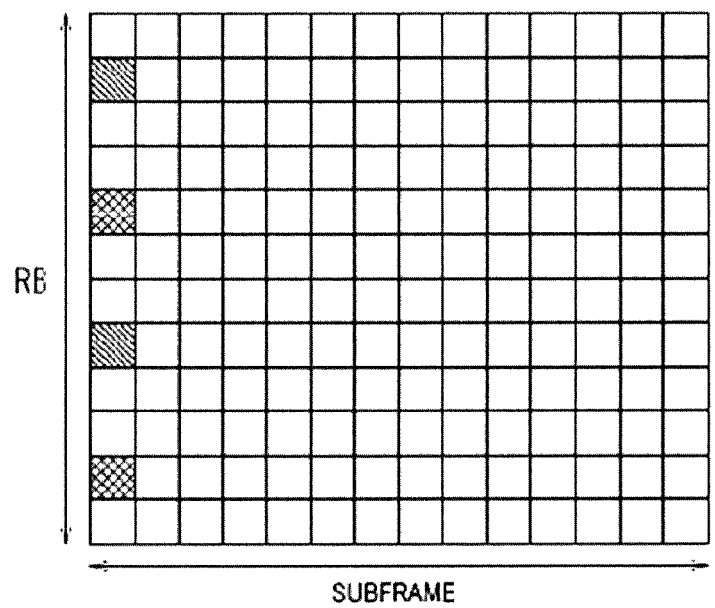
FIG. 10(b) is a diagram illustrating a pattern in which CRSS are assigned to only a first symbol in one subframe in the CRS structure of FIG. 10(a)

Further, the CRS sequence generating section 11 switches the CRS structure so that the "normal structure" (for example, FIG. 10(a)) and "low-density structure" (for example, FIG. 10(b)) coexist according to instructions from the upper layer. Then, the multiplexing section 13 multiplexes the "normal structure" and the "low-density structure" in time division to transmit (for example, FIG. 11). The LTE-A terminal is capable of receiving and demodulating both the "normal structure" and the "low-density structure", but the LTE terminal is not capable of supporting the "low-density structure". Therefore, the downlink control information generating section 12 performs signaling of control information (for example, MBSFN subframe information) for causing the LTE terminal to identify the "low-density structure" as a subframe with no need of retrieval to the LTE terminal.

The downlink control information generating section 12 mainly generates the downlink control information that is transmitted on the PDCCH. The downlink control information is capable of including scheduling information of the PDSCH and PUSCH indicative of subcarrier positions assigned by the scheduler, etc., modulation method, channel coding rate, format information of precoding information, etc., the above-mentioned DM-RS sequence information, and further, the control information for enabling the "low-density structure" to be identified as a subframe with no need of retrieval when the "low-density structure" is multiplexed in time division.

The precoding information is divided into precoding information used in precoding the CRS for antenna virtualization and precoding information used in precoding to enable concurrently transmitted streams (layers) to be orthogonally received on the receiver side. When antenna virtualization is applied, these two types of precoding information are included in the downlink control information.

Precoding sections 14 provide each transmission antenna with weighting for antenna virtualization to transmit a signal with the CRS and downlink control information multiplexed thereinto. The number of virtualized antennas is adjusted by weighting for antenna virtualization added to each transmission antenna by the precoding section 14. When the CRSS are transmitted using the CRS structures as shown in FIGS. 10(a) and 10(b), two CRSS are precoded and transmitted from each transmission antenna.

By this means, when the number of virtualized antennas is assumed to be "1", even in the case of 8-transmission antenna configuration actually, since two CRSs that is two times the number of virtualized antennas are transmitted, as compared with the case of multiplexing and transmitting four CRSS corresponding to all four transmission antennas as shown in FIG. 3, it is possible to reduce overhead, and the overhead reduction effect is further increased in the case of eight transmission antennas.

Further, even in the case of assuming that the number of virtualized antennas is "1", by transmitting CRSs corresponding to two antennas, the LTE terminal supporting two antennas is capable of obtaining the transmission diversity effect on the control channel by two-antenna transmission.

Further, the base station apparatus 200 is provided with CQI-RS sequence generating sections 15 that generate CQI-RSs for CSI measurement for each transmission antenna, and inter-antenna orthogonalizing sections 16 that orthogonalize the CQI-RSs generated for each transmission antenna among antennas. Since the CQI-RS sequence generating sections 15 generate CQI-RSs for each antenna corresponding to eight transmission antennas, the inter-antenna orthogonalizing sections 16 provide multiplexing for orthogonalization among eight antennas.

For example, CQI-RSs are assigned to different subcarriers in the same resource block in the last symbol of each subframe (for example, FDM as shown in FIG. 13(a)). Further, when the CQI-RSs increase to also support orthogonalization among cells, CQI-RSs are assigned to different subcarriers in the same resource block in the last symbol of each subframe, and further, the resource elements assigned the CQI-RSs are multiplexed in code division (for example, CDM as shown in FIG. 13(b)). Furthermore, CQI-RSs are assigned to different subcarriers in the same resource block in a plurality of symbols in the same subframe.

Thus, as downlink reference signals, aside from the CRS subjected to antenna virtualization, CQI-RSs are generated for each actual transmission antenna and transmitted, and therefore, even when signals are transmitted in antenna virtualization, the LTE terminal and LTE-A terminal are capable of measuring the CSI for each antenna and measuring the channel quality.

Further, by preparing various multiplexing schemes in consideration of orthogonalization among antennas and orthogonalization among cells, it is possible to cope with increases in the number of CQI-RSs.

Further, the base station apparatus 200 is provided with DM-RS sequence generating sections 18 that generate DM-RSs for each data stream, and inter-stream orthogonalizing sections 19 that orthogonalize DM-RSs among streams when DM-RSs of multi-stream are generated.

The DM-RS sequence generating sections 18 generate DM-RSs for demodulation of the PDSCH dedicated to the user, and for the DM-RSs, the DM-RS density per resource block (subframe) is optimized. Therefore, it is possible to vary the DM-RS density per resource block (subframe) to some density patterns (for example, FIGS. 16(a), 16(b) and FIG. 17), and common symbols (for example, the 4th symbol, 7th symbol, 10th symbol and 13th symbol) are used as symbols to multiplex DM-RSs in the density patterns.

Further, the DM-RS sequence generating sections 18 multiplex the DM-RSs for different streams into the common symbols, while assigning to different subcarriers (for example, FIGS. 18(a) and 18(b)).

The inter-stream orthogonalizing sections 19 apply multiplexing for orthogonalization among streams to DM-RSs of which the DM-RS density is optimized by the DM-RS sequence generating sections 18.

In one of the schemes, as shown in FIGS. 19(a) and 19(b), DM-RSs are assigned to common symbols (4th symbol, 7th symbol, 10th symbol and 13th symbol) in the first stream #1 and second stream #2, and in each of the common symbols, it is configured that a subcarrier that transmits the DM-RS of the first stream #1 does not transmit the DM-RS in the second stream #2.

By this means, in transmitting the DM-RS in multi-stream transmission, since it is configured that the same subcarrier of the same symbol for transmitting the DM-RS in one of streams does not transmit the signal in the other stream, interference does not occur between streams, and it is possible to actualize extremely high orthogonality.

In the other scheme, as shown in FIGS. 20(a) and 20(b), the DM-RSs of the first stream #1 are multiplied by two-dimensional Walsh codes with all the coefficients set at "+1" to code, and the DM-RSs of the second stream #2 are multiplied by two-dimensional Walsh codes with the coefficients alternately set at "+1" or "−1" in the time-frequency direction and the frequency-axis direction to code.

In addition, the DM-RSs of the second stream #2 are arranged in the same resource elements as in the first stream #1 at the same density as in the first stream #1. The two-dimensional Walsh codes are capable of being included in the DM-RS sequence information for signaling to the mobile station. Alternately, the two-dimensional Walsh codes may be beforehand set on the mobile station as known information.

When the first stream #1 and second stream #2 that are thus coded using two-dimensional Walsh codes that are orthogonal codes as shown in FIGS. 20(a) and 20(b) are added in the time-axis direction or frequency-axis direction, signals of the paired stream are canceled, interference does not occur between streams, and it is possible to actualize extremely high orthogonality.

Further, the base station apparatus 200 is provided with downlink transmission data generating sections 22 that generate downlink transmission data to the mobile station, and downlink transmission data coding/modulation sections 23 that code and modulate the downlink transmission data. The downlink transmission data coding/modulation sections 23 perform error correcting coding and modulation with a predetermined data modulation scheme on the data to output. The downlink transmission data generating sections 22 and downlink transmission data coding/modulation sections 23 are provided for each stream.

The multiplexing section 21 multiplexes the downlink transmission data and DM-RSs for each stream to output to the precoding section 24. The precoding section 24 performs weighting for each antenna to enable concurrently transmitted streams (layers) to be orthogonally received on the receiver side (normal precoding for MIMO transmission).

A downlink channel multiplexing section 25 of the base station apparatus 200 multiplexes reference signals for transmitting the CRSs subjected to antenna virtualization, CQI-RSs generated for each transmission antenna and DM-RSs generated for each stream, the PDCCH for transmitting the downlink control information, the PDSCH for transmitting the downlink transmission data and other required downlink channels. The channel-multiplexed signal is subjected to inverse fast Fourier transform in an inverse fast Fourier transform section 26, and transformed into a signal in the time domain, a CP adding section 27 provides the signal with a cyclic prefix that is a guard interval to prevent inter-symbol interference, and then, the signal is amplified in a transmission amplifier 28 and transmitted.

The transmission processing as described above is performed for each transmission antenna. In addition, the downlink control information and CRSs are generated on a virtualized antenna basis, while the downlink transmission data and DM-RSs are generated on a stream basis, as described above.

The mobile station 100 according to the Embodiment of the invention will be described with reference to FIG. 2.

A reception processing series of the mobile station 100 receives a signal including downlink reference signals comprised of CRSS, CQI-RSs and DM-RSs as described above. After the CRSS, CQI-RSs and DM-RSs are divided from the reception signal, the CRS is used in channel estimation of shared/dedicated control channel on a virtualized antenna basis, the CQI-RS is used in channel quality measurement for each of actual transmission antennas, and the DM-RS is used in channel estimation on a stream basis.

In the reception processing series, the reception signal is input to a CP removing section 31, and the cyclic prefix is removed from the signal. A fast Fourier transform section 32 performs fast Fourier transform on the reception signal with the CP removed, and thereby transforms time-series signal components into a string of frequency components. A downlink channel dividing section 33 subcarrier-demaps the reception signal to divide into the reference signal for transmitting the RS sequence signal, the control channel (for example, PHICH and PDCCH) for transmitting the downlink control information and the shared channel (for example, PDSCH) for transmitting the transmission data.

Among reception symbols of the divided reference signal, the CRS is input to a CRS channel estimation section 36. Further, the PDCCH (or PDSCH) is input to a downlink control information demodulation/decoding section 37.

The CRS channel estimation section 36 performs channel estimation on the PDCCH (or PDSCH) subjected to antenna virtualization transmission from the received CRS information. The downlink control information demodulation/decoding section 37 demodulates and decodes the downlink control information based on the CRS information. The DM-RS sequence information for each stream transmitted on the PDCCH is delivered to a DM-RS channel estimation section 38 that performs channel estimation on the corresponding stream.

Further, among reception symbols of the reference signal, the CQI-RSs are input to CQI/PMI estimation sections 34 of corresponding antennas (or cells). The CQI/PMI estimation section 34 measures the CSI for each antenna using the CQI-RS in association with each antenna, and estimates the channel quality corresponding to the measurement result of CSI to output to a feedback information generating section 35 as a CQI measurement value.

Thus, even when data is transmitted by the number of virtualized antennas smaller than the number of actual transmission antennas by antenna virtualization, the mobile station 100 is capable of performing CQI measurement for each of actual transmission antennas, and of sending the CQI measurement values for each antenna to the base station apparatus 200 as the feedback information.

Further, among reception symbols of the reference signal, the DM-RSs are input to corresponding DM-RS channel estimation sections 38. Further, the PDSCH is input to downlink transmission data demodulation/decoding sections 39. The DM-RS channel estimation section 38 acquires the DM-RS of the corresponding stream using the DM-RS sequence information obtained by decoding the PDSCH (or PDSCH), and performs channel estimation on the stream using the DM-RS. The downlink transmission data demodulation/decoding section 39 demodulates and decodes the downlink transmission data based on channel estimation.

Thus, even when the data is transmitted by the number of virtualized antennas smaller than the number of actual transmission antennas by antenna virtualization, the mobile station 100 is capable of acquiring the DM-RS for each stream and demodulating the PDSCH.

The present invention is not limited to the above-mentioned Embodiment, and is capable of being carried into practice with various modifications thereof without departing from the subject matter of the invention.

INDUSTRIAL APPLICABILITY

The present invention is applicable to radio communication systems.

The present application is based on Japanese Patent Application No. 2009-063594 filed on Mar. 16, 2009, entire content of which is expressly incorporated by reference herein.

The invention claimed is:

1. A radio base station apparatus comprising:
a plurality of transmission antennas;
a processor configured to orthogonalize Demodulation Reference Signals (DM-RSs) associated with layers of a Multiple-Input Multiple-Output (MIMO) transmission each allocated to a plurality of radio resources of layers by using two-dimensional orthogonal codes, whereby DM-RSs of a first layer are allocated to same radio resources as in a second layer and are allocated at a same density as in the second layer; and
a transmitter configured to transmit a signal wherein DM-RSs and transmission data are multiplexed, from the plurality of transmission antennas in multiple layers,
wherein an index of information of the DM-RSs including the two-dimensional orthogonal codes is signaled to a mobile station apparatus, and the index corresponds to one or more antennas of the plurality of transmission antennas.

2. A mobile station apparatus comprising:
a receiver configured to receive a signal wherein Demodulation Reference Signals (DM-RSs) and transmission data are multiplexed, the DM-RSs associated with layers of a Multiple-Input Multiple-Output (MIMO) transmission being allocated to a plurality of radio resources of layers and being orthogonalized by using two-dimensional orthogonal codes, whereby DM-RSs of a first layer are allocated to same radio resources as in a second layer and are allocated at a same density as in the second layer; and
a processor configured to demodulate the transmission data by using the DM-RSs,
wherein an index of information of the DM-RSs including the two-dimensional orthogonal codes is signaled from a radio base station apparatus, and the index corresponds to one or more antennas of a plurality of transmission antennas of the radio base station apparatus.

3. A radio communication method comprising:
in a radio base station apparatus,
orthogonalizing Demodulation Reference Signals (DM-RSs) associated with layers of a Multiple-Input Multiple-Output (MIMO) transmission each allocated to a plurality of radio resources of layers by using two-dimensional orthogonal codes, whereby DM-RSs of a first layer are allocated to same radio resources as in a second layer and are allocated at a same density as in the second layer;
transmitting a signal wherein DM-RSs and transmission data are multiplexed, from a plurality of transmission antennas in multiple layers;
in a mobile station apparatus,
receiving the signal; and
demodulating the transmission data by using the DM-RSs of the signal,
wherein an index of information of the DM-RSs including the two-dimensional orthogonal codes is signaled from the radio base station apparatus to the mobile station apparatus by physical downlink control channel (PDCCH) or higher layer signaling, and the index corresponds to one or more antennas of the plurality of transmission antennas.

4. A radio communication system comprising:
a radio base station apparatus comprising:
a first processor configured to orthogonalize Demodulation Reference Signals (DM-RSs) associated with layers of a Multiple-Input Multiple-Output (MIMO) transmission each allocated to a plurality of radio resources of layers by using two-dimensional orthogonal codes, whereby DM-RSs of a first layer are allocated to same radio resources as in a second layer and are allocated at a same density as in the second layer; and
a transmitter configured to transmit a signal wherein DM-RSs and transmission data are multiplexed, from a plurality of transmission antennas in multiple layers; and
a mobile station apparatus comprising:
a receiver configured to receive the signal; and
a second processor configured to demodulate the transmission data by using the DM-RSs of the signal,
wherein an index of information of the DM-RSs including the two-dimensional orthogonal codes is signaled from the radio base station apparatus to the mobile station apparatus, and the index corresponds to one or more antennas of the plurality of transmission antennas.

* * * * *